United States Patent
Williams et al.

(10) Patent No.: US 10,803,859 B1
(45) Date of Patent: Oct. 13, 2020

(54) SPEECH PROCESSING FOR PUBLIC DEVICES

(71) Applicant: Amazon Technologies, Inc., Seattle, WA (US)

(72) Inventors: Robert Williams, San Francisco, CA (US); Miriam Karthika Daniel, Cupertino, CA (US); Eric Alan Breitbard, Oakland, CA (US); Sean Robert Ryan, Larkspur, CA (US); Meng Li, San Francisco, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/695,777

(22) Filed: Sep. 5, 2017

(51) Int. Cl.
| | |
|---|---|
| G10L 15/22 | (2006.01) |
| G10L 15/30 | (2013.01) |
| G10L 17/06 | (2013.01) |
| G10L 17/22 | (2013.01) |
| G10L 13/08 | (2013.01) |
| G10L 13/04 | (2013.01) |
| G10L 15/18 | (2013.01) |
| G10L 15/14 | (2006.01) |
| G10L 15/08 | (2006.01) |

(52) U.S. Cl.
CPC .............. *G10L 15/22* (2013.01); *G10L 13/04* (2013.01); *G10L 13/08* (2013.01); *G10L 15/30* (2013.01); *G10L 17/06* (2013.01); *G10L 17/22* (2013.01); *G10L 15/142* (2013.01); *G10L 15/1815* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,781,723 A | * | 7/1998 | Yee | G06F 9/4411 713/159 |
| 5,928,325 A | * | 7/1999 | Shaughnessy | G06Q 10/107 709/206 |
| 7,035,828 B2 | * | 4/2006 | Ketonen | G06Q 10/10 704/8 |
| 8,543,834 B1 | * | 9/2013 | Barra | G06F 3/167 713/186 |
| 9,271,111 B2 | * | 2/2016 | Blanksteen | H04W 4/02 |
| 9,286,910 B1 | * | 3/2016 | Li | G10L 25/48 |
| 9,304,736 B1 | * | 4/2016 | Whiteley | G06Q 20/40145 |
| 9,898,250 B1 | * | 2/2018 | Williams | G06F 3/167 |
| 10,032,044 B2 | * | 7/2018 | Vas | G06F 21/6245 |
| 2002/0107807 A1 | * | 8/2002 | Ketonen | G06Q 10/10 705/51 |

(Continued)

*Primary Examiner* — Fariba Sirjani
(74) *Attorney, Agent, or Firm* — Pierce Atwood LLP

(57) ABSTRACT

A speech-processing system capable of receiving spoken commands from a public or semi-public voice controlled device and determine a user who spoke the command for purposes of both command execution and output data routing. Identity of the user may be determined by various techniques such as facial identification, voice identification and the like. Identification techniques may be biased in view of users nearby to a voice controlled device. Private data resulting from the spoken command may be routed to a personal device of the user where non-private data may be output by the public voice controlled device.

22 Claims, 14 Drawing Sheets

(56) References Cited

U.S. PATENT DOCUMENTS

| | | | |
|---|---|---|---|
| 2014/0172953 A1* | 6/2014 | Blanksteen | H04W 4/02 709/203 |
| 2016/0077785 A1* | 3/2016 | Sugden | G02B 27/017 345/8 |
| 2017/0039388 A1* | 2/2017 | Vas | G06F 21/6245 |
| 2017/0289598 A1* | 10/2017 | Labsky | H04N 21/4786 |

* cited by examiner

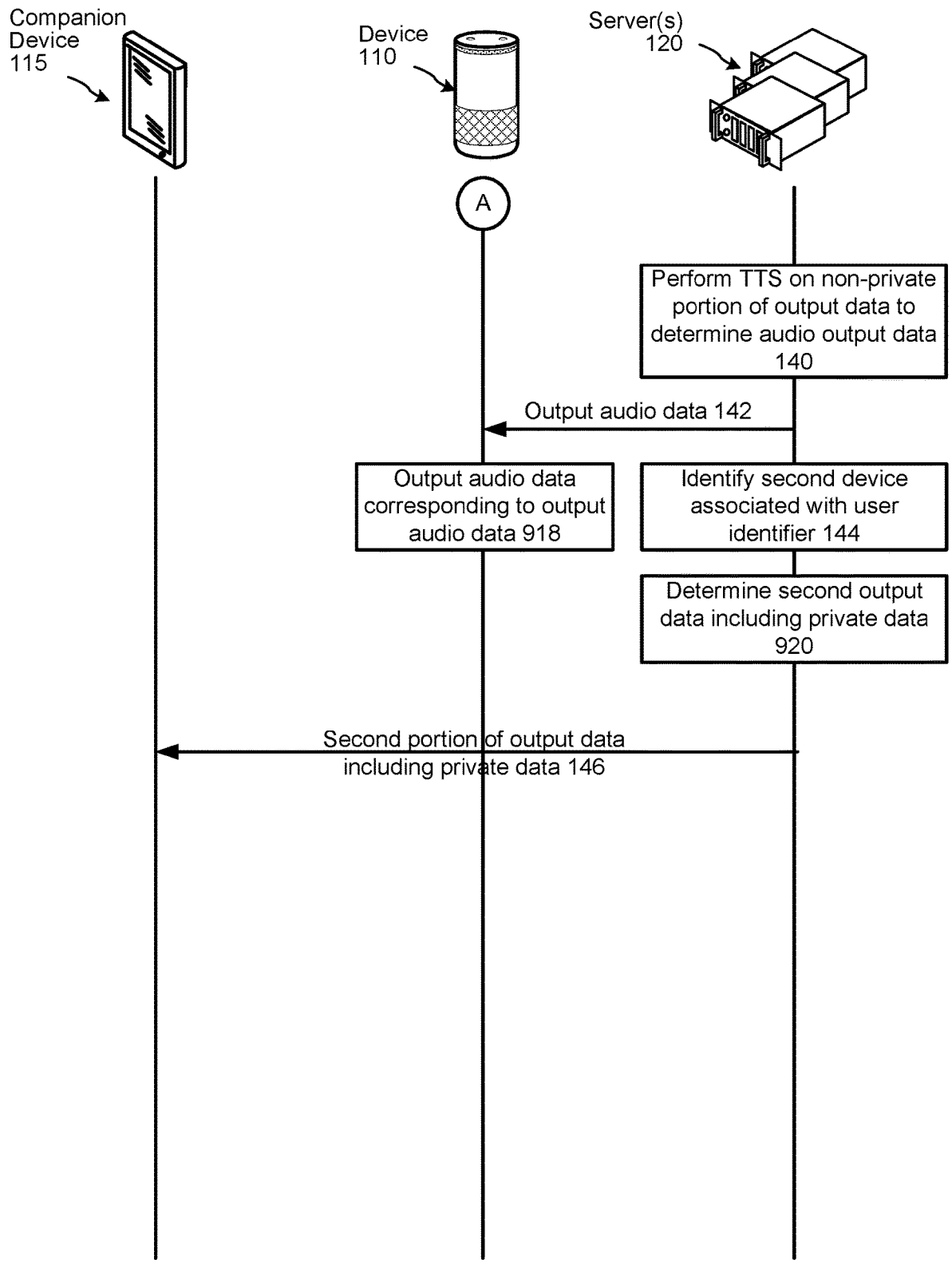

SPEECH PROCESSING FOR PUBLIC DEVICES

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of automatic speech recognition processing and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 9A-9B illustrate a signal flow diagram according to embodiments of the present disclosure.

DETAILED DESCRIPTION

Figure 1:
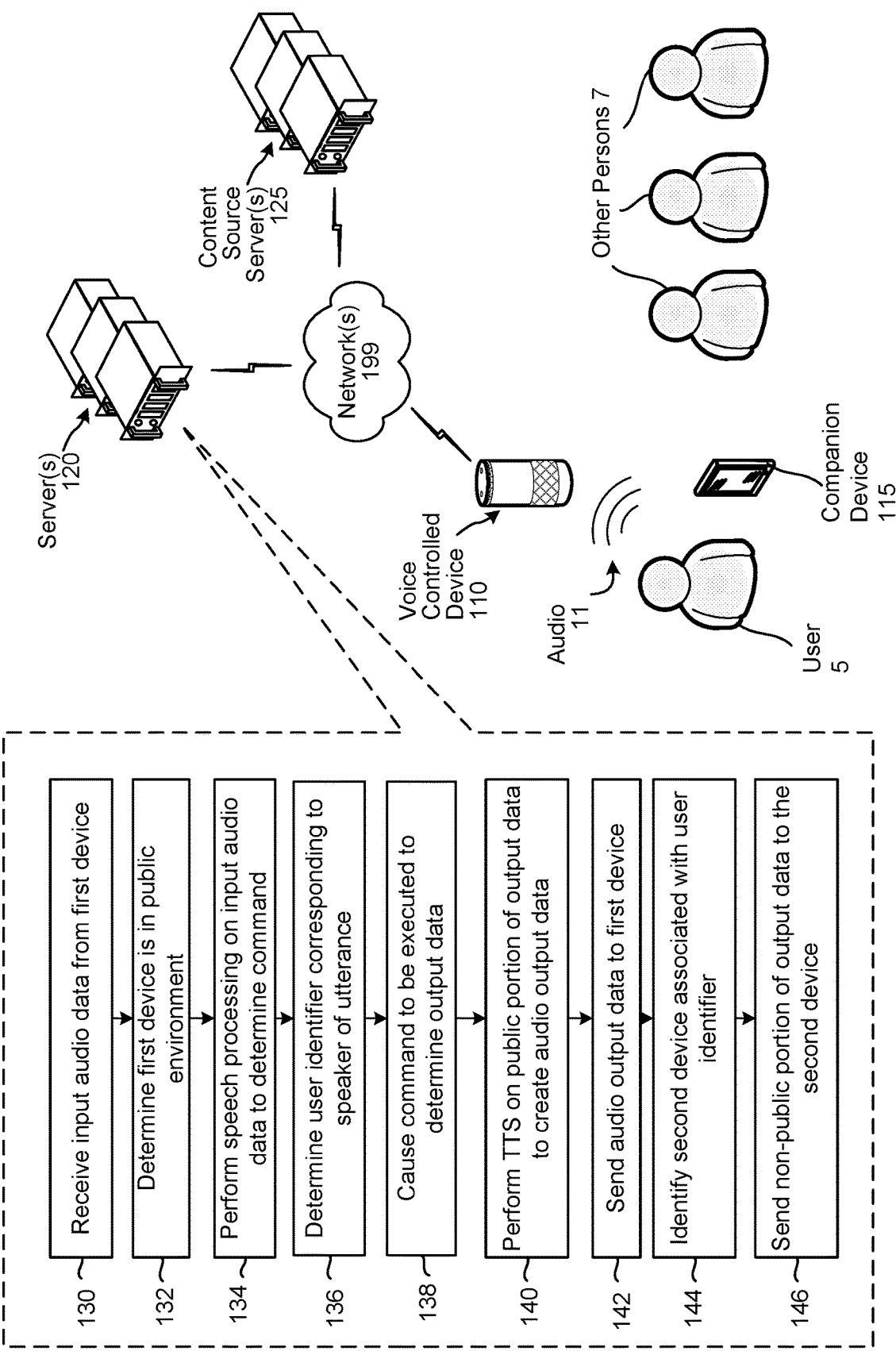
FIG. 1 illustrates a system configured to determine if incoming speech is system-directed speech according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. The combination of ASR and NLU may be referred to herein as speech processing.

ASR and NLU can be computationally expensive. That is, significant computing resources may be needed to process ASR and NLU processing within a reasonable time frame. Because of this, a distributed computing environment may be used when performing speech processing. An example of such a distributed environment may involve a local device having one or more microphones being configured to capture sounds from a user speaking and circuitry configured to convert those sounds into an audio signal. The audio signal/data may then be sent to a downstream remote device for further processing, such as for converting the audio signal into an ultimate command. The command may then be executed by a remote and/or (the) local device(s) depending on the command itself.

Such a speech processing computing system may be configured to execute a variety of user commands to perform actions, request content, etc. For example, a user may say "what is the weather in Seattle." The system may determine content responsive to the command (e.g., weather information for Seattle) and output the content to the user. The output content may be sent to a device that captured the original speech request or may be sent to another device associated with the user, for example the user's smartphone, tablet, television, etc. depending on the request made by the user. Further, the system may execute some command unrelated to the audio capture device (e.g., ordering a taxi, turning on a light in another room, or the like) and may or may not acknowledge execution of the command to the audio capture device or another device associated by the user, for example by speaking an acknowledgement of the command, sending a text message with reservation information, or the like.

A speech processing system may be configured to execute a number of commands where proper execution of the command depends on the identity of the user speaking the command. For example, if a user instructs a system to "make a dinner reservation at eight o'clock," the system needs to know the identity of the user for purposes of making the reservation. In another example, if a user instructs a system to "turn off the dining room lights," the system needs to know whose dining room lights to turn off. Such information is particularly important for general purposes speech processing systems that can execute thousands of commands in different ways depending on who spoke the command.

In certain system configurations, user identity (for purposes of command execution) is relatively straightforward as an individual voice controlled device may be owned by a particular user, may reside at a user's home, and/or may be associated with a user profile. Thus if the system receives a command such as "turn off the dining room lights" the system may, relatively easily, determine the user profile for the voice controlled device that captured the utterance and with the user profile, determine which lights to turn off. Similarly, other user-specific commands such as "play my road trip playlist," "call mom," "book me a ride to my office," and the like may be properly executed using information associated with a user profile corresponding to the device that captured the utterance.

In other situations, however, determining the user who spoke the command is not as straightforward. Particularly, with devices that may not be associated with a user profile, for example a voice controlled device that resides in a hotel lobby may not be associated with a particular user profile and thus the system may have difficulty executing user-specific tasks without knowing the identity of the user speaking the command.

Further, if a command spoken to a public device (such as a voice controlled kiosk in a hotel lobby) requires output of certain private information (such as a user's hotel room number) it may be undesirable to output that private information through the public device in a way that may be received by individuals other than the intended user.

To address these and other issues, offered is a system that can determine if a voice controlled device is a public or semi-public device and take further user-identifying actions for purposes of properly executing a command, properly determining an output device, granting access to further information, and other tasks as discussed herein.

For present purposes a public device may be a device in a public location, that is a location that is accessible by individuals without those individuals requiring any special access rights (for example a mall, hotel lobby, public park, street corner, airport, or the like). Further, for present purposes a semi-public device may be a device in semi-public location, that is a location that is accessible by many individuals that may require some special access rights (for example an office conference room, hotel conference space, restricted access area, inside a vehicle such as an airplane, cruise ship or bus, or the like). A private or individual device may be a device that is in a private location such as a home. Depending on the circumstances, a mobile device, wearable device or other personal device may be considered semi-public or private. For example, a mobile device belonging to a user may be considered semi-public for audio output purposes but may be considered private for audio output purposes if headphones are active for that mobile device. Further, even a public device or semi-public device may be considered private if conditions are such in the environment of the device that output data may reasonably be provided to the requesting user without being accessed by other individuals. Thus the system may determine a type of environment of a voice controlled device where the type may include various potential environments such as public, semi-public, private, high-person traffic, low-person traffic, high noise volume, low noise volume, capable (or not capable) of private screen displays, or other environment types.

FIG. 1 illustrates a system for processing spoken commands from public or semi-public devices. Although the figures and discussion herein illustrate certain operational steps of the system in a particular order, unless explicitly stated otherwise, the steps described may be performed in a different order (as well as certain steps removed or added) without departing from the intent of the disclosure. As illustrated in FIG. 1, a voice controlled device 110 local to a user 5, one or more servers 120, and one or more content source servers 125 may be connected across one or more networks 199. Further, the user may also be associated with a companion device 115 that may be accessible to the networks 199.

The network 199 is representative of any type of communication network, including data and/or voice network, and can be implemented using wired infrastructure (e.g., cable, CAT5, fiber optic cable, etc.), a wireless infrastructure (e.g., Wi-Fi, radio frequency (RF), cellular, microwave, satellite, Bluetooth®, etc.), and/or other connection technologies.

The server(s) 120 may generally refer to a network-accessible platform—or "cloud-based service"—implemented as a computing infrastructure of processors, storage, software, data access, and so forth that is maintained and accessible via the network 199, such as the Internet. Cloud-based services may not require end-user knowledge of the physical location and configuration of the system that delivers the services. Common expressions associated with cloud-based services, such as the server(s) 120, include "on-demand computing," "software as a service (SaaS)," "platform computing," "network accessible platform," and so forth. In some instances, cloud-based services may be provided via a remote server. In some instances, some or all of the functionality of the server(s) 120 may be provided by a computing device located within various environments, and in some instances, a server located in a user environment may be referred to as a local server. For example, and without limitation, a user locator module 295 (discussed below) may be provided for the user 5. That is to say, a user may maintain a computing device at their home, for example, to function as a "hub" to coordinate activity and communication between the voice-controlled device 110, the server 120, the individual devices in an environment, and the like. For example, a location of a user may be determined by a computing device associated with each user apart from a "cloud-based service," to maintain privacy for each user.

As shown in FIG. 1, the voice controlled device 110 may be in a public or semi-public area so that not only is user 5 within the environment of the voice controlled device 110, but other persons 7 may also be within the same environment. Further, the voice controlled device 110 may be associated with a device profile or other data that indicates the device 110 is in a public or semi-public location. The device profile may be associated with a public device type accessible by any speaker. Further the device profile may not be associated with a default user profile, which may also indicate a public or semi-public device. The voice controlled device 110 may thus not be associated with a user profile.

As shown in FIG. 1, the voice controlled device 110 may capture audio 11 of an utterance, may convert that audio 11 to audio data and may send the audio data to the server(s) 120. The server(s) 120 receive (130) the input audio data from the device 110. The server(s) 120 may then determine (132) that the first device is in a public or semi-public environment. This may include determining that the device is associated with a device profile or other indicator (such as a public flag or other data) indicating that the device is in a public or semi-public location. The server(s) 120 performs (134) speech processing on the input audio data to determine a command. To do so the system may determine speech processing results such as ASR results (for example one or more ASR hypothesis and respective scores), NLU results and/or scores, or the like. The speech processing results may indicate that the input audio data corresponds to a command, for example a request for information (e.g., "what is the weather at home tomorrow"), a request for the output of content (e.g., "play my turn down for what playlist"), a request to perform an action (e.g., "book me a flight to Seattle"), etc.

In order to properly execute the command the system may determine the identity of a user who spoke the command. This may include the server(s) 120 determining (136) a user identifier corresponding to a speaker of the utterance. The user identifier may be a unique ID associated with the user or with a user profile associated with the user. The server(s) 120 may use various techniques to determine the user identifier, such as those illustrated herein, in particular those discussed below in reference to FIGS. 3 and 4, though other techniques may be used. The server(s) 120 may then cause (138) the command to be executed (using the speech processing results and the user identifier) to determine output data. The output data may come from a content source server 125 that is capable of executing all or part of the spoken command.

As the command may be specific to the user, the output data corresponding to the command may include certain public and certain non-public portions. For example, if the command corresponds to a request to check in to a hotel, the command may result in checking the user into the hotel as well as sending the user a check-in acknowledgment, the room number, and a code to access the room. Such output data may take the form of text such as "Thank you for checking in to the Downtown Plaza. Ms. Smith, your room number is 1312 and your room code is 24601." A first portion of the text ("Thank you for checking in to the Downtown Plaza.") may be considered a public portion of the output data. A second portion of the text ("Ms. Smith, your room number is 1312 and your room code is 24601.") may be considered a non-public portion of the output data. (Use of the modifiers "first," "second," etc. do not imply any particular order and are only used to differentiate items between each other.)

The server(s) 120 may then perform (140) TTS processing on the pubic portion of the output data to create audio output data and send (142) the audio output data to the voice controlled device 110 along with an instruction for the voice controlled device 110 to output audio corresponding to the audio output data. The sever(s) may also identify (144) a second device associated with the user identifier. For example, the user may also have a companion device 115, such as a mobile phone, which may not be publicly accessible. The server(s) 120 may then send (146) the non-public portion of the output data to the second device. In this way the system can use a public device to receive an utterance, identify the user who spoke the utterance, and deliver to the user both public and non-public data responsive to the utterance. Other aspects of the system are discussed below.

Figure 2:
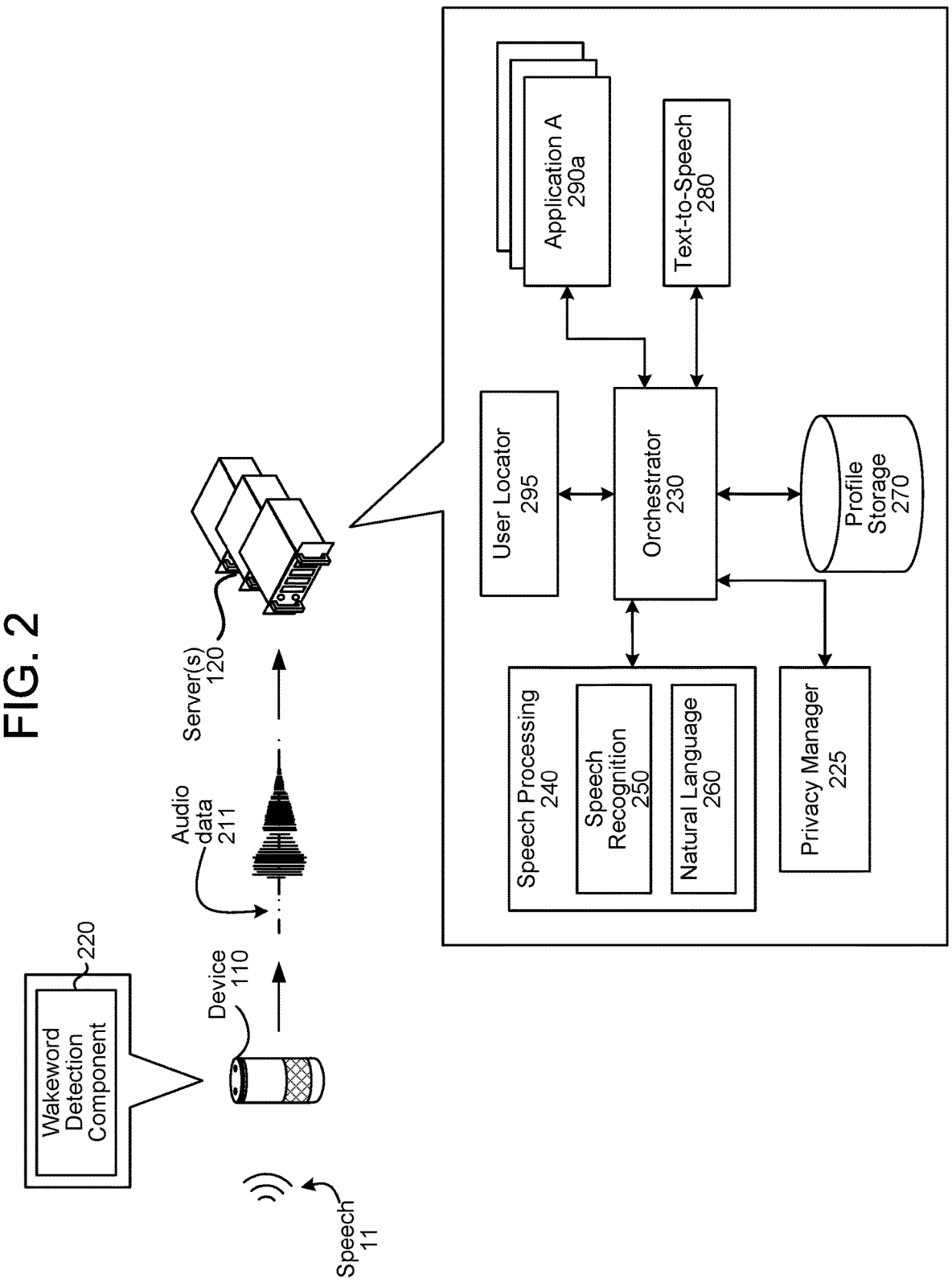
FIG. 2 is a conceptual diagram of components of a system according to embodiments of the present disclosure.

The system may operate using various components as described in FIG. 2. The various components illustrated FIG. 2 may be located on a same or different physical devices. Communication between various components illustrated in FIG. 2 may occur directly or across a network(s) 199.

The device 110 captures audio corresponding to speech 11, using an audio capture component, such as a microphone or array of microphones. The device 110, using a wakeword detection component 220, processes audio data corresponding to the input audio 11 to determine if a keyword (e.g., a wakeword) is detected in the audio data. Following detection of a wakeword, the device 110 sends audio data 211, corresponding to the speech, to the server(s) 120.

The wakeword detection component 220 works in conjunction with other components of the device, for example microphone(s) to detect keywords in audio 11. For example, the device 110 may convert audio 11 into audio data 211, and process the audio data 211 with the wakeword detection component 220 to determine whether speech is detected, and if so, if the audio data 211 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection component 220 to perform wakeword detection to determine whether a wakeword is detected in the speech, thus indicating that a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data 211 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. While the local device 110 is transmitting audio data to the server(s), the local device 110 may also turn on an indicator (such as an LED light or other visual indicator, special beep or other audio indicator, or otherwise) that indicates to the user that the microphone(s) is "on" and that captured audio is being sent to the server(s) 120. The device 110 may also "wake" in response to a different wake command such as the pressing of a button, detection of a particular gesture, or the like.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. A speech recognition component 250 of the speech processing component 240 transcribes the audio data 211 into one or more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units such as phonemes or senons) and sequences of sounds to identify words that match the sequence of sounds spoken in the utterance represented in the audio data 211. The speech recognition component 250 sends text data generated thereby to a natural language component 260 of the speech processing component 260. The text data sent from the speech recognition component 250 to the natural language component 260 may include a top scoring textual interpretation of the audio data 211 or may include an N-best list including a group of textual interpretations of the audio data 211 and potentially their respective scores.

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user command represented in the text data (e.g., an action that the user desires be performed) as well as pertinent pieces of information in the text data that allow a device (e.g., the device 110, the server(s) 120, etc.) to complete the intent. For example, if the text data corresponds to "call mom," the natural language component 260 may determine the user intended to activate a telephone in his/her device and to initiate a call with a contact matching the entity "mom."

The server(s) 120 may include a user locator module 295. The user locator module 295 may determine the location of one or more users as explained below in reference to FIGS. 3 and 4. The server(s) may include a privacy manager 225 that may be configured to determine whether a voice controlled device 110 is public, semi-public or private. The privacy manager 225 may also be configured to determine if output data resulting from a command is public or private and may coordinate with the orchestrator 230, application 290, and other components to properly route public and private information to appropriate downstream devices. The privacy manager 25 may also coordinate granting access to certain further information that may correspond to an utterance, for example allowing users who were present in an environment when an utterance was spoken to access information that may result from the utterance or related events (such as meetings, groups, etc.), for example as discussed below in reference to FIG. 10.

The server(s) 120 may include a profile storage 270. The profile storage 270 may include a variety of information related to individual devices, groups of devices, individual users, groups of users, etc. that interact with the system as described below.

The orchestrator component 230 may send output from the natural language component 260 (e.g., text data including tags attributing meaning to the words and phrases represented in the text data), and optionally output from the user locator module 295 and/or data from the profile storage 270, to one or more applications 290. FIG. 2 illustrates various applications 290 executed by the server(s) 120. However, it should be appreciated that the orchestrator component 230 may additionally or alternatively send output from the natural language component 260 to one or more content source servers 125 executing applications that may thereby cause the content source servers 125 to provide the server(s) 120 with content responsive to the command.

An "application," as used herein, may be considered synonymous with a skill. A "skill" may be software running on the server(s) 120 that is akin to an application. That is, a skill may enable the server(s) 120 or other remote device to execute specific functionality in order to provide data or produce some other output requested by a user. The system may be configured with more than one skill. A skill may either be executed by the server(s) 120 or merely associated with the server(s) 120 (i.e., one executed by a different remote device). For example, a weather service skill may enable the server(s) 120 to execute a command with respect to a weather service server(s), a car service skill may enable the server(s) 120 to execute a command with respect to a taxi or ride sharing service server(s), an order pizza skill may enable the server(s) 120 to execute a command with respect to a restaurant server(s), etc.

The orchestrator component 230 may choose which application 290 to send data to based on the output of the natural language component 260. In an example, the orchestrator component 230 may send data to a music playing application when the natural language component 260 outputs text data associated with a command to play music. In another example, the orchestrator component 230 may send data to a weather application when the natural language component 260 outputs text data associated with a command to output weather information. In yet another example, the orchestrator component 230 may send data to a search engine application when the natural language component 260 outputs text data associated with a command to obtain search results.

An application 290 may output text data, which the orchestrator component 230 may send to a text-to-speech component 280. The text-to-speech component 280 may synthesize speech corresponding to the text data input therein. The orchestrator component 230 or other component of the server(s) 120 may send audio data synthesized by the text-to-speech component 280 (or other output data from application 290) to the device 110 (or another device including a speaker and associated with the same user ID or customer ID) for output to the user.

The text-to-speech component 280 may perform speech synthesis using one or more different methods. In one method of synthesis called unit selection, the text-to-speech component 280 matches text data against a database of recorded speech. Matching units are selected and concatenated together to form audio data. In another method of synthesis called parametric synthesis, the text-to-speech component 280 varies parameters such as frequency, volume, and noise to create an artificial speech waveform output. Parametric synthesis uses a computerized voice generator, sometimes called a vocoder.

The various components 225, 230, 240, 250, 260, 280, 290 may be exist in software, hardware, firmware or some combination thereof.

As discussed above, in some instances, a user can be located within a room or a zone associated with an environment, such as a home of the user, a hotel, a mall, an office, a conference area or other public, semi-public, or private location. In some instances, a user environment may include imaging devices that can image the environment and perform facial recognition, voice matching, or other techniques, to determine that the user (e.g., "Alice" or "Bob") is in a particular room or zone of an environment. In some instances, it may not be possible to identify a user with certainty, and an environment may monitor other sensor data associated with a user to improve a certainty or confidence level of an identity and/or location of the user. For example, the user environment may include sensors to monitor a signal strength of a radio frequency (RF) signal associated with a user or associated with a computing device, such as a smartphone, or wearable device, such as a smartwatch, of a user. Based upon a received signal strength indicator (RSSI), RF localization or triangulation, or other techniques, the system can increase or decrease the confidence level of an identity and/or a location of the user. In some instances, various smart appliances (e.g., a lamp, a refrigerator, etc.) can monitor a RF signal associated with a user and transmit information relating to the signal strength to the server for use in determining the identity and/or location of the user. Similarly, in environments with multiple voice-controlled devices (or multiple devices capturing audio), a location of a user can be determined by comparing the amplitude or strength of a received audio signal between the various devices.

In some instances, the location of a user is tracked and updated as the user moves from one location to another. The location of the user is stored in memory, and updated based in part on a location event, which may correspond to a change in location of the user. In some instances, when a communication is initiated between a first user and a second user, the first user may receive the location of the second user, and may receive updates of the location of the second user as the user moves about an environment.

For instance, an environment may include an array of devices that are configured to perform an array of operations. To illustrate, an environment may include devices such as televisions, set-top boxes, microphones, speakers, audio systems, imaging devices, computers, computing devices, smartphones, telephones, tablets, modems, routers, lights, dishwashers, washing machines, coffee machines, refrigerators, door locks, window blinds, thermostats, garage door openers, air-conditioning units, alarm systems, motion sensors, biometric sensors, pressure sensors, radio frequency sensors, ovens, microwaves, and the like. These devices may be capable of coupling to a network (e.g., a LAN, WAN, etc.) and/or may be capable of communicating with other devices via wireless radio communication (e.g., Wi-Fi, Bluetooth®, Zigbee®, Z-Wave®, LoRa®, etc.). Communication among devices may use network(s) 199 or other communication channels. As such, these devices may be utilized to locate a user within an environment, and/or may include functions and capabilities that can be grouped together to facilitate communications that may otherwise not be possible if the devices remained as standalone devices. These devices may be controllable by a user remotely, such as via a graphical user interface (GUI) on a mobile phone of the user, via voice commands of the user, or the like.

In some instances, the environment includes a device configured to receive voice commands from the user and to cause performance of the operations requested via these voice commands. Such a device, which may be known as a "voice-controlled device," may include one or more microphones for capturing audio signals that represent or are otherwise associated with sound from an environment, including voice commands of the user. The voice-controlled device may also be configured to perform automated speech recognition (ASR) on the audio signals, or may be configured to provide the audio signals to another device (e.g., a device of a server) for performing the ASR on the audio signals. After the voice-controlled device or another device identifies a voice command of the user, the voice-controlled device or the other device may attempt to direct the requested operation to be performed.

Figure 3:
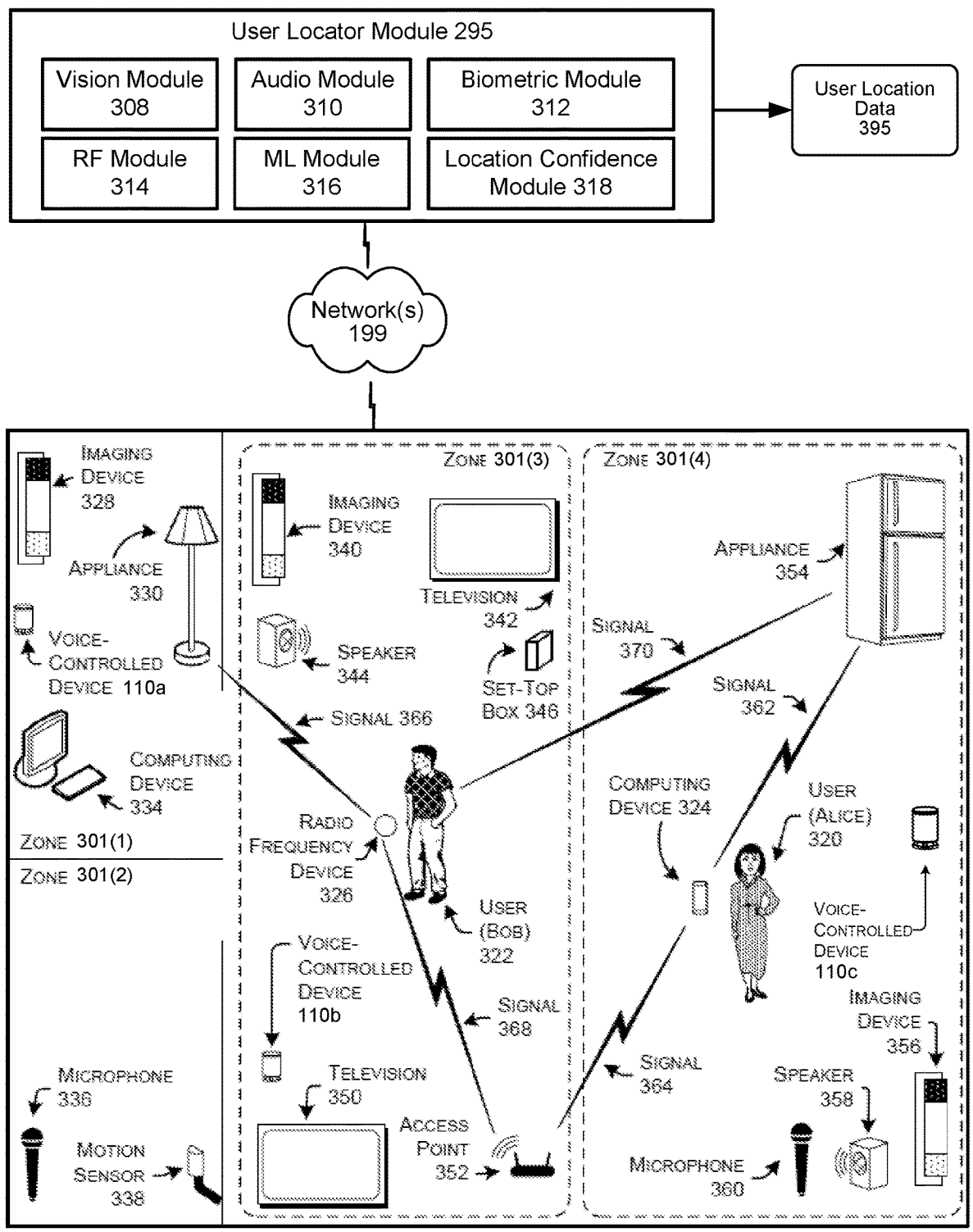
FIG. 3 is a schematic diagram of an illustrative architecture in which sensor data is combined to determine locations of users according to embodiments of the present disclosure.

A user locator component 295 may determine the location of one or more users using a variety of data. As illustrated in FIG. 3, the user locator module 295 may include one or more modules including a vision module 308, an audio module 310, a biometric module 312, a radio frequency module 314, a machine learning module 316, and a location confidence module 318. In some instances, the user locator module 295 may monitor data and determinations from one or more modules to determine an identity of a user and/or a location of a user in an environment 302. The user locator module 295 may output user location data 395 which may include a user identifier matched with location information as to where the system believes the particular user of the user identifier is located. The location information may include geographic information (such as an address, city, state, country, geo-position (e.g., GPS coordinates), velocity, latitude, longitude, altitude, or the like). The location information may also include a device identifier, zone identifier or environment identifier corresponding to a device/zone/environment the particular user is nearby/within. Output of the user locator module 295 may be used to inform natural language component 260 processes as well as processing performed by applications 290, routing of output data, permission access to further information, etc. The details of the vision module 308, the audio module 310, the biometric module 312, the radio frequency module 314, the machine learning module 316, and the location confidence module 318 are provided below following a description of the environment 302.

In some instances, the environment 302 may represent a home or office associated with a user 320 "Alice" and/or a user 322 "Bob." In some instances, the user 320 "Alice" may be associated with a computing device 324, such as a smartphone. In some instances, the user 322 "Bob" may be associated with a radio frequency device 326, such as a wearable device (e.g., a smartwatch) or an identifier beacon.

The environment 302 may include, but is not limited to, a number of devices that may be used to locate a user. For example, within zone 301(1), the environment 302 may include an imaging device 328, an appliance 330, a voice-controlled device 110a, and a computing device 334. Within zone 301(2), the environment 302 may include a microphone 336 and a motion sensor 338. Within zone 301(3), the environment may include an imaging device 340, a television 342, a speaker 344, a set-top box 346, a voice-controlled device 110b, a television 350, and an access point 352. Within zone 301(4), the environment 302 may include an appliance 354, an imaging device 356, a speaker 358, a voice-controlled device 110c, and a microphone 360.

Further, in some instances, the user locator module 295 may have information regarding the layout of the environment 302, include details regarding which devices are in which zones, the relationship between zones (e.g., which rooms are adjacent), and/or the placement of individual devices within each zone. In some instances, the user locator module 295 can leverage knowledge of the relationships between zones and the devices within each zone to increase a confidence level of user identity and location as a user moves about the environment 302. For example, in a case where the user 322 is in zone 301(3), and subsequently moves beyond a field of view of the imaging device 340 into the zone 301(2), the user locator module 295 may infer a location and/or identity of the user to determine with a high confidence level (in combination with data from one or more other devices) that any motion detected by the motion sensor 338 corresponds to movement by the user 322.

In some instances, the vision module 308 may receive data from one or more sensors capable of providing images (e.g., such as the imaging devices 328, 340, 356 and the computing devices 324 and 334) or sensors indicating motion (e.g., such as the motion sensor 338). In some instances, the vision module 308 can perform facial recognition or image analysis to determine an identity of a user and to associate that identity with a user profile associated with the user. In some instances, when a user (e.g., the user 322 "Bob") is facing the imaging device 340, the vision module 308 may perform facial recognition and identify the user 322 with a high degree of confidence. In some instances, the vision module 308 may have a low degree of confidence of an identity of a user, and the user locator module 295 may utilize determinations from additional modules to determine an identity and/or location of a user. In some instances, the vision module 308 can be used in conjunction with other modules to determine when a user is moving to a new location within the environment 302. In some instances, the vision module 308 can receive data from one or more imaging devices to determine a layout of a zone or room, and/or to determine which devices are in a zone and where they are located. In some instances, data from the vision module 308 may be used with data from the audio module 310 to identify what face appears to be speaking at the same time audio is captured by a particular device the user is facing for purposes of identifying a user who spoke an utterance.

In some instances, the environment 302 may include biometric sensors that may transmit data to the biometric module 312. For example, the biometric module 312 may receive data corresponding to fingerprints, iris or retina scans, thermal scans, weights of users, a size of a user, pressure (e.g., within floor sensors), etc., and may determine a biometric profile corresponding to a user. In some instances, the biometric module 312 may distinguish between a user and sound from a television, for example. Thus, the biometric module 312 may incorporate biometric information into a confidence level for determining an identity and/or location of a user. In some instances, the biometric information from the biometric module 312 can be associated with a specific user profile such that the biometric information uniquely identifies a user profile of a user.

In some instances, the radio frequency (RF) module 314 may use RF localization to track devices that a user may carry or wear. For example, as discussed above, the user 320 (and a user profile associated with the user) may be associated with a computing device 324. The computing device 324 may emit RF signals (e.g., Wi-Fi, Bluetooth®, etc.), which are illustrated as signals 362 and 364. As illustrated, the appliance 354 may detect the signal 362 and the access point 352 may detect the signal 364. In some instances, the access point 352 and the appliance 354 may indicate to the RF module 314 the strength of the signals 364 and 362 (e.g., as a received signal strength indication (RSSI)), respectively. Thus, the RF module 314 may compare the RSSI for various signals and for various appliances and may determine an identity and/or location of a user (with an associated confidence level). In some instances, the RF module 314 may determine that a received RF signal is associated with a mobile device that is associated with a particular user. In some instances, a device (e.g., the access point 352) may be configured with multiple antennas to determine a location of a user relative to the device using beamforming or spatial diversity techniques. In such a case, the RF module 314 may receive an indication of the direction of the user relative to an individual device.

As illustrated, the appliance 330 may receive a signal 366 from the RF device 326 associated with the user and a user profile, while the access point 352 may receive a signal 368. Further, the appliance 354 can receive a signal 370 from the RF device 326. In an example where there is some uncertainty about an identity of the users in zones 301(3) and 301(4), the RF module 314 may determine that the RSSI of the signals 362, 364, 366, 368, and/or 370 increases or decreases a confidence level of an identity and/or location of the users, such as the user 320 and 324. For example, if an RSSI of the signal 362 is higher than the RSSI of the signal 370, the RF module may determine that it is more likely that a user in the zone 301(4) is the user 320 than the user 322. In some instances, a confidence level of the determination may depend on a relative difference of the RSSIs, for example.

In some instances a voice controlled device 110, or another device proximate to the voice controlled device 110 may include some RF or other detection processing capabilities so that a user who speaks an utterance may scan, tap, or otherwise acknowledge his/her personal device (such as a phone) to a sensing device in the environment 302. In this manner the user may "register" with the system for purposes of the system determining who spoke a particular utterance. Such a registration may occur prior to, during, or after speaking of an utterance.

In some instances, the machine learning module 316 may track the behavior of various users in the environment as a factor in determining a confidence level of the identity and/or location of the user. By way of example, it may be the case that the user 320 adheres to a regular schedule, such that the user 320 is outside the environment 302 during the day (e.g., at work or at school). In this example, the machine learning module 316 would factor in past behavior and/or trends into determining the identity and/or location. Thus, the machine learning module 316 may user historical data and/or usage patterns over time to increase or decrease a confidence level of an identity and/or location of a user.

In some instances, the location confidence module 318 receives determinations from the various modules 308, 310, 312, 314, and 316, and may determine a final confidence level associated with the identity and/or location of a user. In some embodiments, the confidence level may determine whether an action is performed. For example, if a user request includes a request to unlock a door, a confidence level may need to be above a threshold that may be higher than a confidence level needed to perform a user request associated with playing a playlist or resuming a location in an audiobook, for example. The confidence level or other score data may be included in user location data 395.

In some instances, the audio module 310 may receive data from one or more sensors capable of providing an audio signal (e.g., the voice-controlled devices 110*a-c*, the microphones 336 and 360, the computing devices 324 and 334, the set-top box 346) to facilitate locating a user. In some instances, the audio module 310 may perform audio recognition on an audio signal to determine an identity of the user and an associated user profile. Further, in some instances, the imaging devices 328, 340, and 356 may provide an audio signal to the audio module 310. In some instances, the audio module 310 is configured to receive an audio signal from one or more devices and may determine a sound level or volume of the source of the audio. In some instances, if multiple sources of audio are available, the audio module 310 may determine that two audio signals correspond to the same source of sound, and may compare the relative amplitudes or volumes of the audio signal to determine a location of the source of sound. In some instances, individual devices may include multiple microphone and may determine a direction of a user with respect to an individual device. In some instances, aspects of the server 120 may be configured at a computing device (e.g., a local server) within the environment 302. Thus, in some instances, the audio module 310 operating on a computing device in the environment 302 may analyze all sound within the environment 302 (e.g., without requiring a wake word) to facilitate locating a user. In some instances, the audio module 310 may perform voice recognition to determine an identity of a user.

The audio module 310 may also perform user identification based on information relating to a spoken utterance input into the system for speech processing. For example, the audio module 310 may take as input the audio data 211 and/or output data from the speech recognition component 250. The audio module 310 may determine scores indicating whether the command originated from particular users. For example, a first score may indicate a likelihood that the command originated from a first user, a second score may indicate a likelihood that the command originated from a second user, etc. The audio module 310 may perform user recognition by comparing speech characteristics in the audio data 211 to stored speech characteristics of users.

Figure 4:
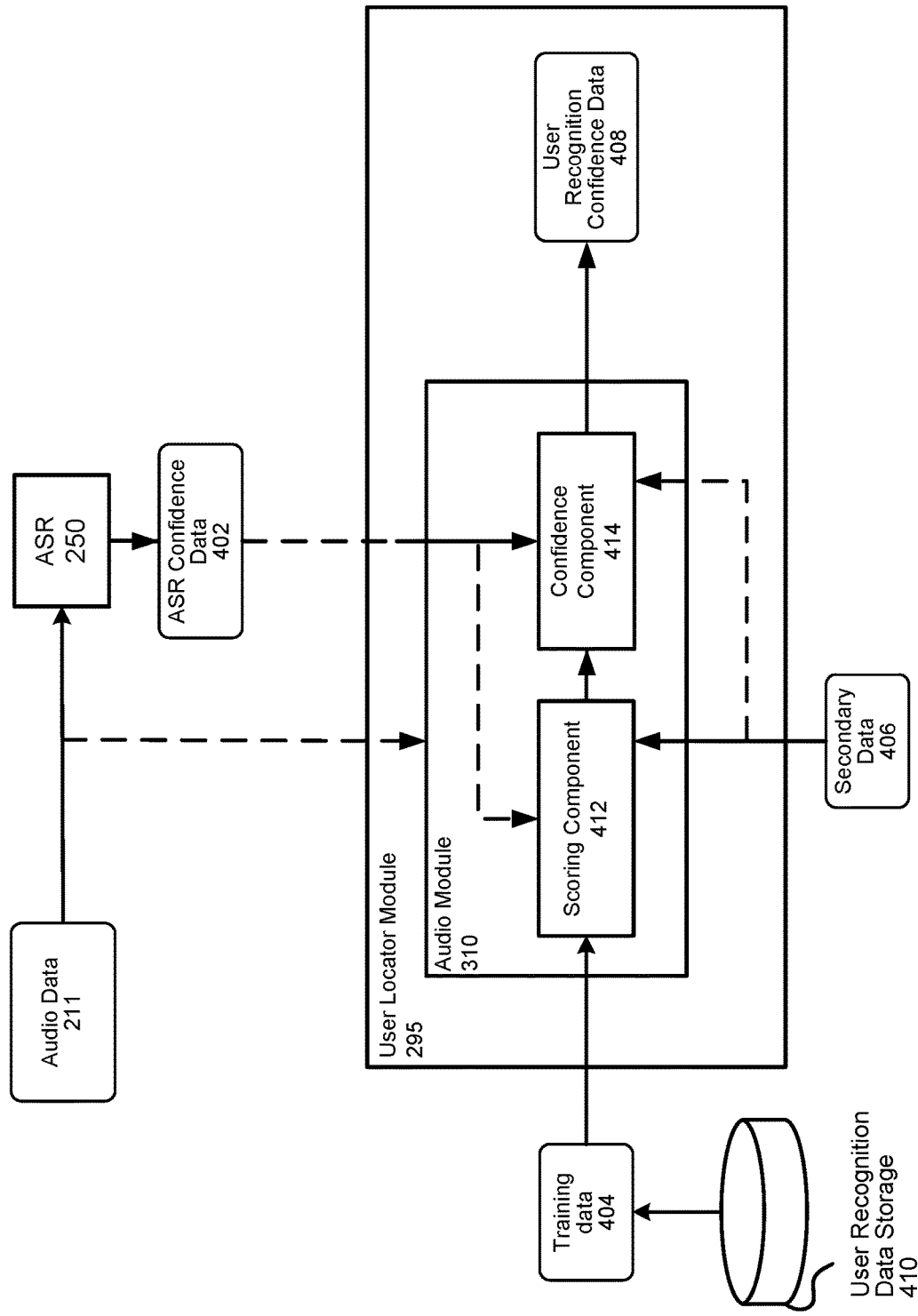
FIG. 4 is a system flow diagram illustrating user recognition according to embodiments of the present disclosure.

FIG. 4 illustrates the audio module 310 of the user locator module 295 performing user recognition using audio data, for example input audio data 211 corresponding to an input utterance. The ASR component 250 performs ASR on the audio data 211 as described herein. ASR output (i.e., text data 741) is then processed by the NLU component 260 as described herein.

The ASR component 250 may also output ASR confidence data 402, which is passed to the user locator module 295. The audio module 310 performs user recognition using various data including the audio data 211, training data 404 corresponding to sample audio data corresponding to known users, the ASR confidence data 402, and secondary data 406. The audio module 310 may output user recognition confidence data 408 that reflects a certain confidence that the input utterance was spoken by one or more particular users. The user recognition confidence data 408 may include an indicator of a verified user (such as a user ID corresponding to the speaker of the utterance) along with a confidence value corresponding to the user ID, such as a numeric value or binned value as discussed below. The user recognition confidence data 408 may be used by various components, including other components of the user locator module 295 to recognize and locate a user, for example nearby to a particular device, in a particular environment, or the like for purposes of performing other tasks as described herein.

The training data 404 may be stored in a user recognition data storage 410. The user recognition data storage 410 may be stored by the server(s) 120, or may be a separate device. Further, the user recognition data storage 410 may be part of a user profile in profile storage 270. The user recognition data storage 410 may be a cloud-based storage. The training data 404 stored in the user recognition data storage 410 may be stored as waveforms and/or corresponding features/vectors. The training data 410 may correspond to data from various audio samples, each audio sample associated with a known user and/or user identity. The audio samples may correspond to voice profile data for one or more users. For example, each user known to the system may be associated with some set of training data 404/voice profile data for the known user. Thus the training data 404 may include a biometric representation of a user's voice. The audio module 310 may then use the training data 404 to compare against incoming audio data 211 to determine the identity of a user speaking an utterance. The training data 404 stored in the user recognition data storage 410 may thus be associated with multiple users of multiple devices. Thus, the training data 404 stored in the storage 410 may be associated with both a user that spoke the respective utterance, as well as the voice controlled device 110 that captured the respective utterance.

To perform user recognition, the audio module 310 may determine the voice controlled device 110 from which the audio data 211 originated. For example, the audio data 211 may include a tag indicating the voice controlled device 110. Either the voice controlled device 110 or the server(s) 120 may tag the audio data 211 as such. The user locator module 295 may send a signal to the user recognition data storage 410, with the signal requesting only training data 404 associated with known users of the voice controlled device 110 from which the audio data 211 originated. This may include accessing a user profile(s) associated with the voice controlled device 110 and then only inputting training data 404 associated with users corresponding to the user profile(s) of the device 110. This limits the universe of possible training data the audio module 310 should consider at runtime when recognizing a user and thus decreases the amount of time to perform user recognition by decreasing the amount of training data 404 needed to be processed. Alternatively, the user locator module 295 may access all (or some other subset of) training data 404 available to the system. Alternatively, the audio module 310 may access a subset of training data 404 of users potentially within the environment of the voice controlled device 110 from which the audio data 211 originated, as may otherwise have been determined by the user locator module 295.

If the audio module 310 receives training data 404 as an audio waveform, the audio module 310 may determine features/vectors of the waveform(s) or otherwise convert the waveform into a data format that can be used by the audio module 310 to actually perform the user recognition. The audio module 310 may then identify the user that spoke the utterance in the audio data 211 by comparing features/vectors of the audio data 211 to training features/vectors (either received from the storage 410 or determined from training data 404 received from the storage 410).

The audio module 310 may include a scoring component 412 which determines respective scores indicating whether the input utterance (represented by audio data 211) was spoken by particular users (represented by training data 404). The audio module 310 may also include a confidence component 414 which determines an overall confidence as the accuracy of the user recognition operations (such as those of the scoring component 412) and/or an individual confidence for each user potentially identified by the scoring component 412. The output from the scoring component 412 may include scores for all users with respect to which user recognition was performed (e.g., all users associated with the voice controlled device 110). For example, the output may include a first score for a first user, a second score for a second user, and third score for a third user, etc. Although illustrated as two separate components, the scoring component 412 and confidence component 414 may be combined into a single component or may be separated into more than two components.

The scoring component 412 and confidence component 414 may implement one or more trained machine learning models (such neural networks, classifiers, etc.) as known in the art. For example, the scoring component 412 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 412 may also use other techniques such as GMMs, generative Bayesian models, or the like, to determine similarity scores.

The confidence component 414 may input various data including information about the ASR confidence 402, utterance length (e.g., number of frames or time of the utterance), audio condition/quality data (such as signal-to-interference data or other metric data), fingerprint data, image data, or other factors to consider how confident the user locator module 295 is with regard to the scores linking users to the input utterance. The confidence component 414 may also consider the similarity scores and user IDs output by the scoring component 412. Thus, the confidence component 414 may determine that a lower ASR confidence represented in the ASR confidence data 402, or poor input audio quality, or other factors, may result in a lower confidence of the audio module 310. Whereas a higher ASR confidence represented in the ASR confidence data 402, or better input audio quality, or other factors, may result in a higher confidence of the audio module 310. Precise determination of the confidence may depend on configuration and training of the confidence component 414 and the models used therein. The confidence component 414 may operate using a number of different machine learning models/techniques such as GMM, neural networks, etc. For example, the confidence component 414 may be a classifier configured to map a score output by the scoring component 412 to a confidence.

The audio module 310 may output user recognition confidence data 408 specific to a single user, or multiple users in the form of an N-best list. For example, the audio module 310 may output user recognition confidence data 408 with respect to each user indicated in the profile associated with the voice controlled device 110 from which the audio data 211 was received. The audio module 310 may also output user recognition confidence data 408 with respect to each user potentially in the location of the voice controlled device 110 from which the audio data 211 was received, as determined by the user locator module 295.

The user recognition confidence data 408 may include particular scores (e.g., 0.0-1.0, 0-1000, or whatever scale the system is configured to operate). Thus the system may output an N-best list of potential users with confidence scores (e.g., John—0.2, Jane—0.8). Alternatively or in addition, the user recognition confidence data 408 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 408 may only include information related to the top scoring user as determined by the audio module 310. The scores and bins may be based on information determined by the confidence component 414. The audio module 310 may also output a confidence value that the scores/bins are correct, where the confidence value indicates how confident the audio module 310 is in the output results. This confidence value may be determined by the confidence component 414.

The confidence component 414 may determine individual user confidences and differences between user confidences when determining the user recognition confidence data 408. For example, if a difference between a first user's confidence score and a second user's confidence score is large, and the first user's confidence score is above a threshold, then the audio module 310 is able to recognize the first user as the user that spoke the utterance with a much higher confidence than if the difference between the users' confidences were smaller.

The audio module 310 may perform certain thresholding to avoid incorrect user recognition results being output. For example, the audio module 310 may compare a confidence score output by the confidence component 414 to a confidence threshold. If the confidence score is not above the confidence threshold (for example, a confidence of "medium" or higher), the user locator module 295 may not output user recognition confidence data 408, or may only include in that data 408 an indication that a user speaking the utterance could not be verified. Further, the audio module 310 may not output user recognition confidence data 408 until enough input audio data 211 is accumulated and processed to verify the user above a threshold confidence. Thus, the audio module 310 may wait until a sufficient threshold quantity of audio data of the utterance has been processed before outputting user recognition confidence data 408. The quantity of received audio data may also be considered by the confidence component 414.

The audio module 310 may be defaulted to output binned (e.g., low, medium, high) user recognition confidence data 408. However, such may be problematic from the command processor(s) 290 perspective. For example, if the audio module 310 computes a single binned confidence for multiple users, an application 290 may not be able to determine which user to determine content with respect to. In this situation, the audio module 310 may be configured to override its default setting and output user recognition confidence data 408 including values (e.g., 0.0-1.0) associated with the users associated with the same binned confidence. This enables the application 290 to select content associated with the user associated with the highest confidence value. The user recognition confidence data 408 may also include the user IDs corresponding to the potential user(s) who spoke the utterance.

The user locator module 295 may combine data from modules 308-318 to determine the location of a particular user. As part of its audio-based user recognition operations, the audio module 310 may use secondary data 406 to inform user recognition processing. Thus, a trained model or other component of the audio module 310 may be trained to take secondary data 406 as an input feature when performing recognition. Secondary data 406 may include a wide variety of data types depending on system configuration and may be made available from other sensors, devices, or storage such as user profile data 504, etc. The second data 406 may include a time of day at which the audio data was captured, a day of a week in which the audio data was captured, the text data 741, NLU results, or other data.

In one example, secondary data 406 may include image data or video data. For example, facial recognition may be performed on image data or video data received corresponding to the received audio data 211. Facial recognition may be performed by the vision module 308 of the user locator module 295, or by another component of the server(s) 120. The output of the facial recognition process may be used by the audio module. That is, facial recognition output data may be used in conjunction with the comparison of the features/vectors of the audio data 211 and training data 404 to perform more accurate user recognition.

The secondary data 406 may also include location data of the voice controlled device 110. The location data may be specific to a building within which the voice controlled device 110 is located. For example, if the voice controlled device 110 is located in user A's bedroom, such location may increase user recognition confidence data associated with user A, but decrease user recognition confidence data associated with user B.

The secondary data 406 may also include data related to the profile of the voice controlled device 110. For example, the secondary data 406 may further include type data indicating a type of the voice controlled device 110. Different types of speech-detection devices may include, for example, a smart watch, a smart phone, a tablet computer, and a vehicle. The type of voice controlled device 110 may be indicated in the profile associated with the voice controlled device 110. For example, if the voice controlled device 110 from which the audio data 211 was received is a smart watch or vehicle belonging to user A, the fact that the voice controlled device 110 belongs to user A may increase user recognition confidence data associated with user A, but decrease user recognition confidence data associated with user B. Alternatively, if the voice controlled device 110 from which the audio data 211 was received is a public or semi-public device, the system may user information about the location of the device to cross-check other potential user locating information (such as calendar data, etc.) to potentially narrow the potential users to be recognized with respect to the audio data 211.

The secondary data 406 may additionally include geographic coordinate data associated with the voice controlled device 110. For example, a profile associated with a vehicle may indicate multiple users (e.g., user A and user B). The vehicle may include a global positioning system (GPS) indicating latitude and longitude coordinates of the vehicle when the audio data 211 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the voice controlled device 110. The global coordinates and associated locations may be associated with respective users in the user profile.

The secondary data 406 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 406 and considered by the audio module 310. If a mobile device (such as a phone, Tile, dongle, or other device) known to be associated with a particular user is detected proximate to (for example physically close to, connected to the same WiFi network as, or otherwise nearby) the voice controlled device 110, this may be reflected in the secondary data 406 and considered by the user locator module 295.

The user recognition confidence data 408 output by the audio module 310 may be used by other components of the user locator module 295 and/or may be sent to one or more applications 290, to the orchestrator 230, or to other components. The application 290 that receives the NLU results and the user recognition confidence score data 408 (or other user location results as output by the user locator module 295) may be determined by the server(s) 120 as corresponding to content responsive to the utterance in the audio data 211. For example, if the audio data 211 includes the utterance "Play my music," the NLU results and user recognition confidence data 408 may be sent to a music playing application 290.

A user identified using techniques described herein may be associated with a user identifier, user profile, or other information known about the user by the system. As part of the user recognition/user location techniques described herein the system may determine the user identifier, user profile, or other such information. The profile storage 270 may include data corresponding to profiles that may be used by the system to perform speech processing. Such profiles may include a user profile that links various data about a user such as user preferences, user owned speech controlled devices, user owned other devices (such as speech-controllable devices), address information, contacts, enabled applications, payment information, etc. Each user profile may be associated with a different user identifier (ID). A profile may be an umbrella profile specific to a group of users. That is, a user profile encompasses two or more individual user profiles, each associated with a unique respective user ID. For example, a profile may be a household profile that encompasses user profiles associated with multiple users of a single household. A profile may include preferences shared by all the user profiles encompassed thereby. Each user profile encompassed under a single user profile may include preferences specific to the user associated therewith. That is, each user profile may include preferences unique with respect to one or more other user profiles encompassed by the same profile. A user profile may be a stand-alone profile or may be encompassed under a group profile.

A profile may also be a device profile corresponding to information about a particular device, for example a device identifier, location, owner entity, whether the device is in a public, semi-public, or private location (which may be indicated by a public and/or semi-public flag), the device capabilities, device hardware, or the like.

A profile may also be an entity profile, for example belonging to a business, organization or other non-user entity. Such an entity profile may include information that may otherwise be found in a user and/or device profile, only such information is associated with the entity. The entity profile may include information regarding which users and/or devices are associated with the entity.

Figure 5:
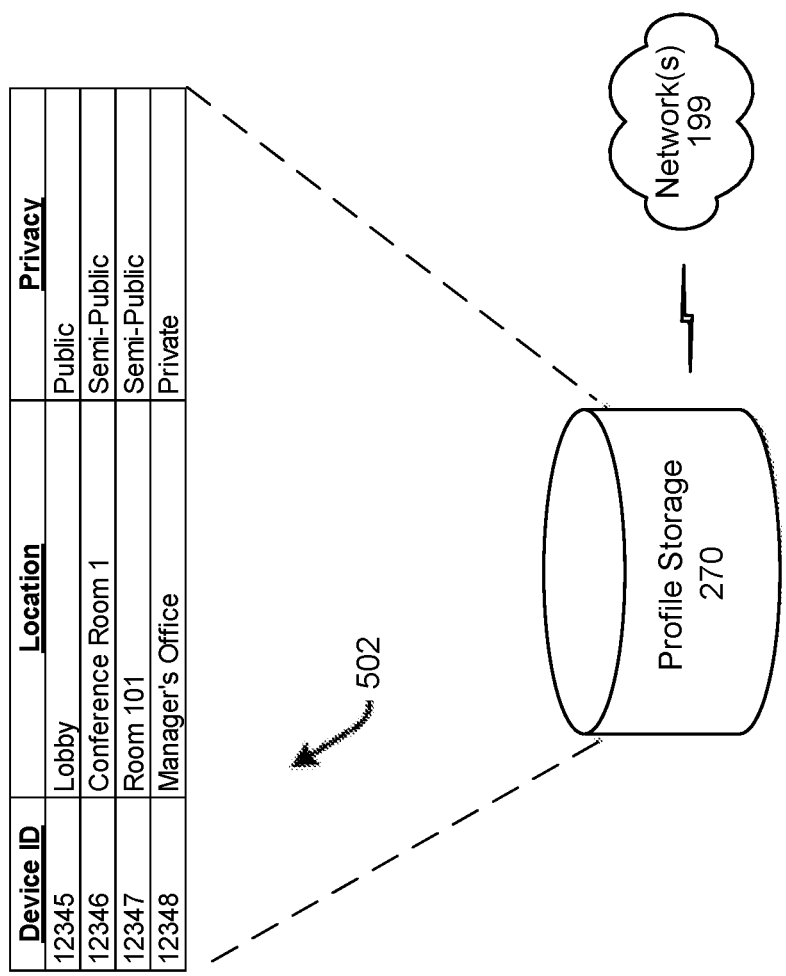
FIG. 5 illustrates data stored and associated with profiles according to embodiments of the present disclosure.

For example, as illustrated in FIG. 5, an entity profile 502 may include information about the devices owned by the entity. In the example illustrated, the entity profile 502 is associated with a hotel and lists four devices: one public device in the lobby, one semi-public device in a conference room, one semi-public device in a room of the hotel and one private device in the manager's office. Various other information may also be stored and/or associated with a profile.

Figure 6:
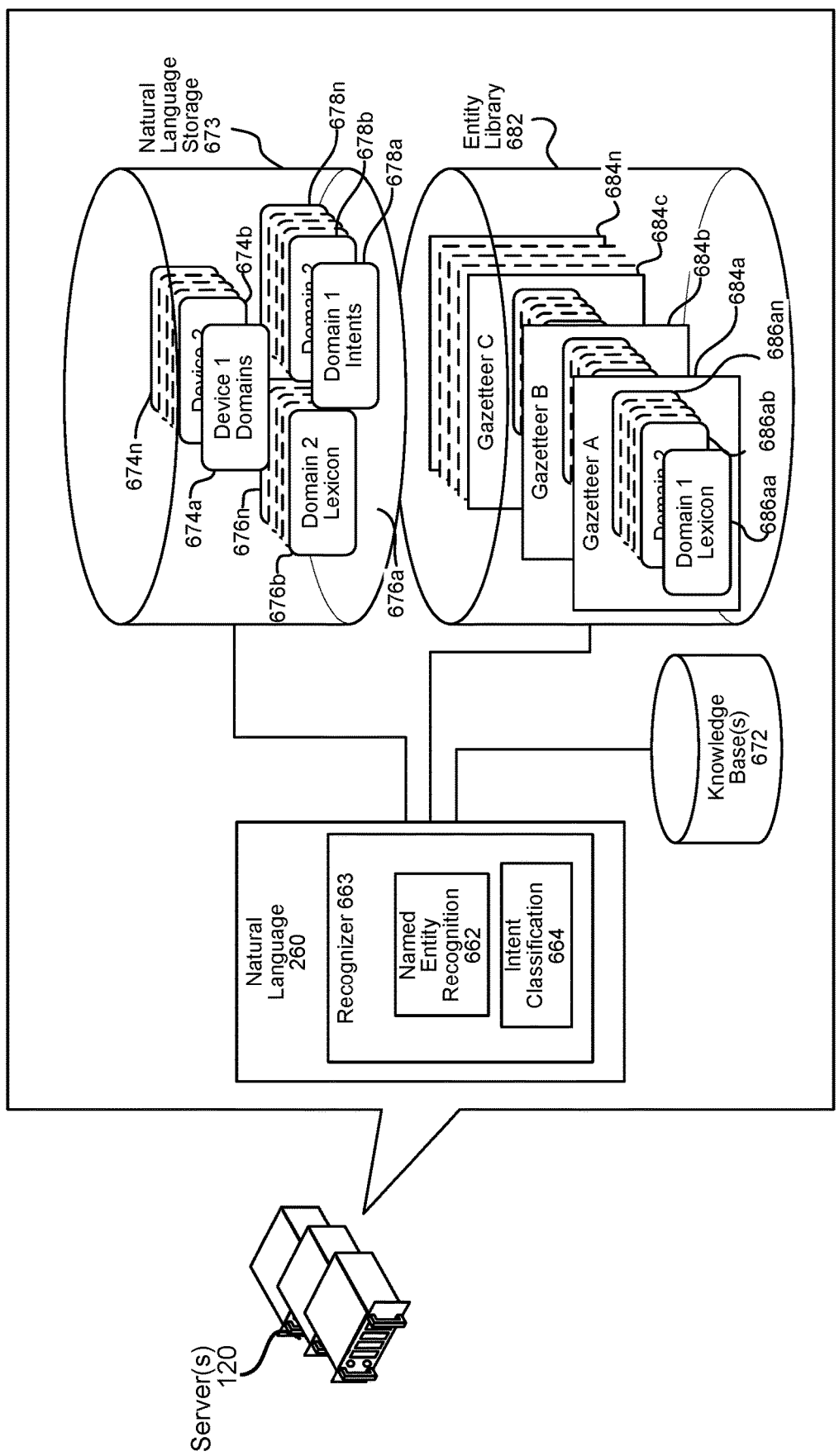
FIG. 6 is a conceptual diagram of how natural language processing is performed according to embodiments of the present disclosure.

FIG. 6 illustrates how natural language processing is performed on audio data. Generally, the natural language component 260 attempts to make a semantic interpretation of text represented in text data (e.g., ASR results 741 output by the speech recognition component 250). That is, the natural language component 260 determines the meaning behind the text represented in text data based on the individual words. The natural language component 260 interprets text to derive an intent or a desired action from an utterance as well as the pertinent pieces of information in the text that allow a device (e.g., device 110, server(s) 120) to complete that action.

The natural language component 260 may process text data including several textual interpretations of a single utterance. For example, if the speech recognition component 250 outputs ASR results 741 including an N-best list of textual interpretations, the natural language component 260 may process the text data with respect to all (or a portion of) the textual interpretations represented therein.

The natural language component 260 may include one or more recognizers 663. Each recognizer 663 may be associated with a different "domain." A domain may correspond to a common group of information or activities, such as weather, music, video, communications, shopping, etc. The natural language component 260 may determine a domain potentially associated with a textual interpretation represented in text data input thereto in order to determine the proper recognizer 663 to process the textual interpretation. The natural language component 260 may determine a single textual interpretation is potentially associated with more than one domain. Multiple recognizers 263 may be functionally linked (e.g., a telephony/communications recognizer and a calendaring recognizer may utilize data from the same contact list).

If the natural language component 260 determines a specific textual interpretation is potentially associated with multiple domains, the recognizers 663 associated with the domains may process the specific textual interpretation in parallel. For example, if a specific textual interpretation potentially implicates both a communications domain and a music domain, a recognizer associated with the communications domain may process the textual interpretation in parallel, or substantially in parallel, with a recognizer associated with the music domain processing the textual interpretation. The output generated by each recognizer 663 may be scored, with the overall highest scored output from all recognizers ordinarily being selected to be the correct result.

The natural language component 260 may communicate with various storages to determine the potential domain(s) associated with a textual interpretation. The natural language component 260 may communicate with the natural language storage 673, which includes a databases of devices (674a-674n) identifying domains associated with specific devices. For example, the device 110 may be associated with domains for music, calendaring, contact lists, device-specific communications, etc. In addition, the natural language component 260 may communicate with an entity library 682, which includes database entries about specific services on a specific device, either indexed by Device ID, Speaker ID, or Household ID, or some other indicator.

Each recognizer 663 may include a named entity recognition (NER) component 662. The NER component 662 attempts to identify grammars and lexical information that may be used to construe meaning with respect to a textual interpretation input therein. The NER component 662 identifies portions of text represented in text data input into the natural language component 260 that correspond to a named entity that may be recognizable by the system. The NER component 662 (or other component of the natural language component 260) may also determine whether a word refers to an entity that is not explicitly mentioned in the utterance text, for example "him," "her," "it" or other anaphora, exophora or the like.

Each recognizer 663, and more specifically each NER component 662, may be associated with a particular grammar model and/or database 676, a particular set of intents/actions 678, and a particular personalized lexicon 686. Each gazetteer 684 may include domain-indexed lexical information associated with a particular user and/or device. For example, the Gazetteer A (684a) includes domain-index lexical information 686aa to 686an. A user's music-domain lexical information might include album titles, artist names, and song names, for example, whereas a user's contact-list lexical information might include the names of contacts. Since every user's music collection and contact list is presumably different, this personalized information improves entity resolution.

An NER component 662 applies grammar models 676 and lexical information 686 associated with the domain (associated with the recognizer 663 implementing the NER component 662) to determine a mention one or more entities in a textual interpretation input therein. In this manner, the NER component 662 identifies "slots" (i.e., particular words in a textual interpretation) that may be needed for later command processing. The NER component 662 may also label each slot with a type of varying levels of specificity (e.g., noun, place, city, artist name, song name, etc.).

Each grammar model 676 includes the names of entities (i.e., nouns) commonly found in speech about the particular domain (i.e., generic terms) to which the grammar model 676 relates, whereas the lexical information 686 is personalized to the user(s) and/or the device from which the audio data 211 originated. For example, a grammar model 676 associated with a shopping domain may include a database of words commonly used when people discuss shopping.

A downstream process called named entity resolution actually links a portion of text to an actual specific entity known to the system. To perform named entity resolution, the natural language component 260 may utilize gazetteer information (684a-684n) stored in an entity library storage 682. The gazetteer information 684 may be used to match text represented in text data output by the speech recognition component 250 with different entities, such as song titles, contact names, etc. Gazetteers may be linked to users (e.g., a particular gazetteer may be associated with a specific user's music collection), may be linked to certain domains (e.g., shopping, music, video, communications, etc.), or may be organized in a variety of other ways.

Each recognizer 263 may also include an intent classification (IC) component 664. The IC component 664 parses an input textual interpretation to determine an intent(s) of the domain associated with the recognizer 663 that potentially corresponds to the textual interpretation. An intent corresponds to an action to be performed that is responsive to the command represented by the textual interpretation. The IC component 664 may communicate with a database 678 of words linked to intents. For example, a music intent database may link words and phrases such as "quiet," "volume off," and "mute" to a "mute" intent. The IC component 664 identifies potential intents by comparing words in the textual interpretation to the words and phrases in an intents database 678 associated with the domain that is associated with the recognizer 663 implementing the IC component 664.

The intents identifiable by a specific IC component 664 are linked to domain-specific (i.e., the domain associated with the recognizer 663 implementing the IC component 664) grammar frameworks 676 with "slots" to be filled. Each slot of a grammar framework 676 corresponds to a portion of the text interpretation that the system believes corresponds to an entity. For example, a grammar framework 676 corresponding to a <PlayMusic> intent may correspond to textual interpretation sentence structures such as "Play {Artist Name}," "Play {Album Name}," "Play {Song name}," "Play {Song name} by {Artist Name}," etc. However, to make resolution more flexible, grammar frameworks 676 may not be structured as sentences, but rather based on associating slots with grammatical tags.

For example, an NER component 662 may parse a textual interpretation to identify words as subject, object, verb, preposition, etc. based on grammar rules and/or models prior to recognizing named entities in the textual interpretation. An IC component 664 (implemented by the same recognizer 663 as the NER component 662) may use the identified verb to identify an intent. The NER component 662 may then determine a grammar model 676 associated with the identified intent. For example, a grammar model 676 for an intent corresponding to <PlayMusic> may specify a list of slots applicable to play the identified "object" and any object modifier (e.g., a prepositional phrase), such as {Artist Name}, {Album Name}, {Song name}, etc. The NER component 662 may then search corresponding fields in a lexicon 686 associated with the domain associated with the recognizer 663 implementing the NER component 662, attempting to match words and phrases in the textual interpretation the NER component 662 previously tagged as a grammatical object or object modifier with those identified in the lexicon 686.

An NER component 662 may perform semantic tagging, which is the labeling of a word or combination of words according to their type/semantic meaning. An NER component 662 may parse a textual interpretation heuristic grammar rules, or a model may be constructed using techniques such as hidden Markov models, maximum entropy models, log linear models, conditional random fields (CRF), and the like. For example, an NER component 662 implemented by a music domain recognizer 663 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 662 identifies "Play" as a verb based on a word database associated with the music domain, which an IC component 664 (also implemented by the music domain recognizer 663) may determine corresponds to a <PlayMusic> intent. At this stage, no determination has been made as to the meaning of "mother's little helper" and "the rolling stones," but based on grammar rules and models, the NER component 662 has determined that the text of these phrases relates to the grammatical object (i.e., entity) of the textual interpretation.

The frameworks linked to the intent are then used to determine what database fields should be searched to determine the meaning of these phrases, such as searching a user's gazetteer 684 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 684 does not resolve a slot/field using gazetteer information, the NER component 662 may search the database of generic words associated with the domain (in the knowledge base 672). For example, if the textual interpretation was "play songs by the rolling stones," after failing to determine an album name or song name called "songs" by "the rolling stones," the NER component 662 may search the domain vocabulary for the word "songs." In the alternative, generic words may be checked before the gazetteer information, or both may be tried, potentially producing two different results.

The natural language component 260 may tag the textual interpretation to attribute meaning to the textual interpretation. For example, the natural language component 260 may tag "play mother's little helper by the rolling stones" as: {domain} Music, {intent} Play Music, {artist name} rolling stones, {media type} SONG, and {song title} mother's little helper. For further example, the natural language component 260 may tag "play songs by the rolling stones" as: {domain} Music, {intent} Play Music, {artist name} rolling stones, and {media type} SONG.

Figure 7:
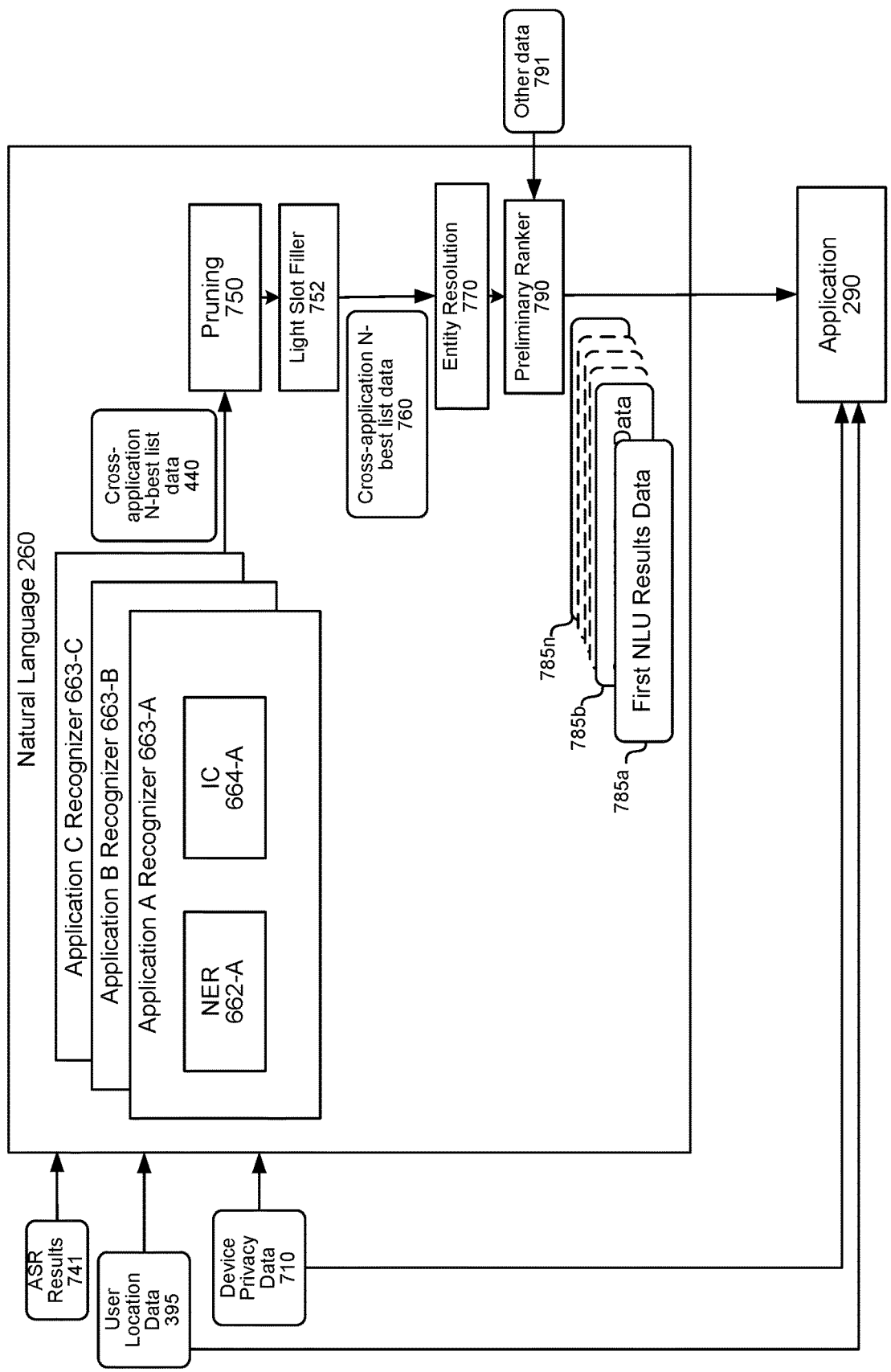
FIG. 7 is a conceptual diagram of how natural language processing is performed according to embodiments of the present disclosure.

Each recognizer 663 may output data corresponding to a single textual interpretation or to an N-best list of textual interpretations. The natural language component 260 may compile the output data of the recognizers 663 into a single cross-domain N-best list, and may send cross-domain N-best list data 740 (representing the cross-domain N-best list) to a pruning component 750 (as illustrated in FIG. 7). The tagged textual interpretations in the cross-domain N-best list data 740 may each be associated with a respect score indicating the tagged textual interpretation corresponds to the domain associated with the recognizer 663 from which the tagged textual interpretation was output. For example, the cross-domain N-best list data 740 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 750 creates a new, shorter N-best list (i.e., represented in cross-domain N-best list data 760 discussed below) based on the cross-domain N-best list data 740. The pruning component 750 may sort the tagged textual interpretations represented in the cross-domain N-best list data 740 according to their respective scores.

The pruning component 750 may perform score thresholding with respect to the cross-domain N-best list data 740. For example, the pruning component 750 may select textual interpretations represented in the cross-domain N-best list data 740 associated with a score satisfying (e.g., meeting and/or exceeding) a score threshold. The pruning component 750 may also or alternatively perform number of textual interpretation thresholding. For example, the pruning component 750 may select the top scoring textual interpretation(s) associated with each different domain represented in the cross-domain N-best list data 740, with the new cross-domain N-best list data 760 including a total number of textual interpretations meeting or falling below a threshold number of textual interpretations. The purpose of the pruning component 750 is to create a new list of top scoring textual interpretations so that downstream (more resource intensive) processes may only operate on the tagged textual interpretations that most likely correspond to the command input to the system.

The natural language component 260 may also include a light slot filler component 752. The light slot filler component 752 can take text from slots represented in the textual interpretation(s) output by the pruning component 750 and alter it to make the text more easily processed by downstream components. The light slot filler component 752 may perform low latency operations that do not involve heavy operations such as reference to a knowledge base. The purpose of the light slot filler component 752 is to replace words with other words or values that may be more easily understood by downstream components. For example, if a textual interpretation includes the word "tomorrow," the light slot filler component 752 may replace the word "tomorrow" with an actual date for purposes of downstream processing. Similarly, the light slot filler component 752 may replace the word "CD" with "album" or the words "compact disc." The replaced words are then included in the cross-domain N-best list data 760.

The natural language component 260 sends the cross-domain N-best list data 760 to an entity resolution component 770. The entity resolution component 770 can apply rules or other instructions to standardize labels or tokens from previous stages into an intent/slot representation. The precise transformation may depend on the domain (e.g., for a travel domain the entity resolution component 770 may transform a text mention of "Boston airport" to the standard BOS three-letter code referring to the airport). The entity resolution component 770 can refer to an authority source (e.g., a knowledge base) that is used to specifically identify the precise entity referred to in each slot of each textual interpretation represented in the cross-domain N-best list data 760. Specific intent/slot combinations may also be tied to a particular source, which may then be used to resolve the text. In the example "play songs by the stones," the entity resolution component 770 may reference a personal music catalog, Amazon Music account, user profile 502 (described herein), or the like. The entity resolution component 770 may output data including an altered N-best list that is based on the cross-domain N-best list represented in the cross-domain N-best list data 760, but also includes more detailed information (e.g., entity IDs) about the specific entities mentioned in the slots and/or more detailed slot data that can eventually be used by an application 290 which may be incorporated into the server(s) 120 components or pipeline or may be on a separate device(s) in communication with the server(s) 120. The natural language component 260 may include multiple entity resolution components 770 and each entity resolution component 770 may be specific to one or more domains.

The entity resolution component 770 may not be successful in resolving every entity and filling every slot represented in the N-best list represented in the cross-domain N-best list data 760. This may result in the entity resolution component 770 outputting incomplete results. The natural language component 260 may include a final ranker component 790, which may consider such errors when determining how to rank the tagged textual interpretations for potential execution. For example, if a book domain recognizer 663 outputs a tagged textual interpretation including a <ReadBook> intent flag, but the entity resolution component 770 cannot find a book with a title matching the text of the item, the final ranker component 790 may re-score that particular tagged textual interpretation to be given a lower score. The final ranker component 790 may also assign a particular confidence to each tagged textual interpretation input therein. The confidence score of a particular tagged textual interpretation may be affected by whether the tagged textual interpretation has unfilled slots. For example, if a tagged textual interpretation associated with a first domain includes slots that are all filled/resolved, that tagged textual interpretation may be associated with a higher confidence than another tagged textual interpretation including at least some slots that are unfilled/unresolved.

The final ranker component 790 may apply re-scoring, biasing, or other techniques to obtain the most preferred tagged and resolved textual interpretation. To do so, the final ranker component 790 may consider not only the data output by the entity resolution component 770, but may also consider other data 791. The other data 791 may include a variety of information. For example, the other data 791 may include application rating or popularity data. For example, if one application has a particularly high rating, the final ranker component 790 may increase the score of a textual interpretation(s) associated with or otherwise invoking that particular application. The other data 791 may also include information about applications that have been specifically enabled by the user. For example, the final ranker component 790 may assign higher scores to textual interpretations associated with or otherwise invoking enabled applications than textual interpretations associated with or otherwise invoking non-enabled applications. User history may also be considered, such as if the user regularly uses a particular supplemental application or does so at particular times of day. Date, time, location, weather, type of device 110, user ID, context, and other information may also be considered. For example, the final ranker component 790 may consider when any particular applications are currently active (e.g., music being played, a game being played, etc.).

Following final ranking, the natural language component 260 may output natural language output data 785. The natural language component 260 may be sent to the orchestrator component 230, which sends the natural language output data 785 to an appropriate application 290 (e.g., one configured to execute a command based on the textual interpretation represented in the natural language output data 785). The natural language output data 785 may include an indicator of the intent of the textual interpretation along with data associated with the intent, for example an indication that the intent is <PlayMusic> and the music to be played is "Adele." Multiple instances of natural language output data (e.g., 785a-785n) may be output for a given set of text data input into the natural language component 260.

The application(s) 290 provides the server(s) 120 with content responsive to the natural language output data 785 received thereby. If the content is text data that needs to be converted to speech, the orchestrator component 230 sends the content text data to the text-to-speech component 280.

User location data 395 and/or device privacy data 710 may also be used by the natural language component 260 and/or the resulting application 290 to ensure that any user specific commands are properly interpreted and executed, and that private output data is output to the user in a manner consistent with the sensitive nature of the private output data. The device privacy data 710 may include information about the device's location (e.g., a private location flag), information about the device's environment (e.g., whether other individuals are around the device and potentially their relationship to the user), and/or other data. The NLU component 260 (or other component, such as orchestrator 230, privacy manager 225, or the like) may then consider the data to be output in response to the utterance, the environment of the device, and/or other data discussed herein in determining how to route and/or change the data to be output in response to the privacy concerns.

As an example interaction, a voice controlled device 110 may be located at the end of a shopping aisle at a grocery store. A user may speak an utterance to the device 110, for example "where can I find graham crackers?" The system may receive the audio data for the utterance, perform speech processing (e.g., ASR and NLU) on the audio data, determine from the NLU results that the utterance requests information about the location of an item in the store, and send NLU results data 785 associated with the request (which may include an identifier of the device 110 and/or identifier of the store in which the device 110 is located) to an application 290a associated with locating grocery items. The application 290a can then use the NLU results data 785 and device/store information to access a gazetteer associated with a store, create output text data corresponding to a response to the utterance (e.g., "graham crackers are located in Aisle 5 on the top shelf"), and send the output text data to the orchestrator 230. The orchestrator 230 may pass the output text data along with information about the user, the device 110, and the device's environment to the privacy manager 225. The privacy manager 225 may determine that the device is public, but that the information in the output text data is also public and may thus instruct the orchestrator 230 that the information may be output in a public manner. The orchestrator 230 may then send the output text data to a TTS component 280 which may convert the output text data into output audio data including synthesized speech. The orchestrator 230 may then send the output audio data back to the device 110 for output, thus answering the user's response about the location of graham crackers within the store.

As another example interaction, the same voice controlled device 110 may be located at the end of a shopping aisle at a grocery store. The same user may speak a different utterance to the device 110, for example "what is still on my shopping list?" The system may receive the audio data for the different utterance, perform speech processing (e.g., ASR and NLU) on the audio data, determine from the NLU results that the utterance requests information about the user's shopping list, and send NLU results data 785 associated with the request (which may include an identifier of the requesting user) to an application 290b associated with tracking a user's shopping list. The application 290b can then use the NLU results data 785 and the user information to access a gazetteer associated with the user and create output text data corresponding to the items on the user's shopping list (e.g., "the remaining items on your list include milk, eggs and bread"), and send the output text data to the orchestrator 230. The orchestrator 230 may pass the output text data along with information about the user, the device 110, and the device's environment to the privacy manager 225. The privacy manager 225 may determine that the device is public, but that the information in the output text data is, in this example, not public. Thus the privacy manager 225 may instruct the orchestrator 230 to send the output data to the user in a non-public way. The orchestrator 230 may then access a profile associated with the user in the profile storage XXA70 to determine a device associated with the user, such as the user's phone. The orchestrator 230 may then cause the output data to be sent to the user's phone, for example by sending a text message to the phone, a message to an application running on the phone, or the like.

Figure 8:
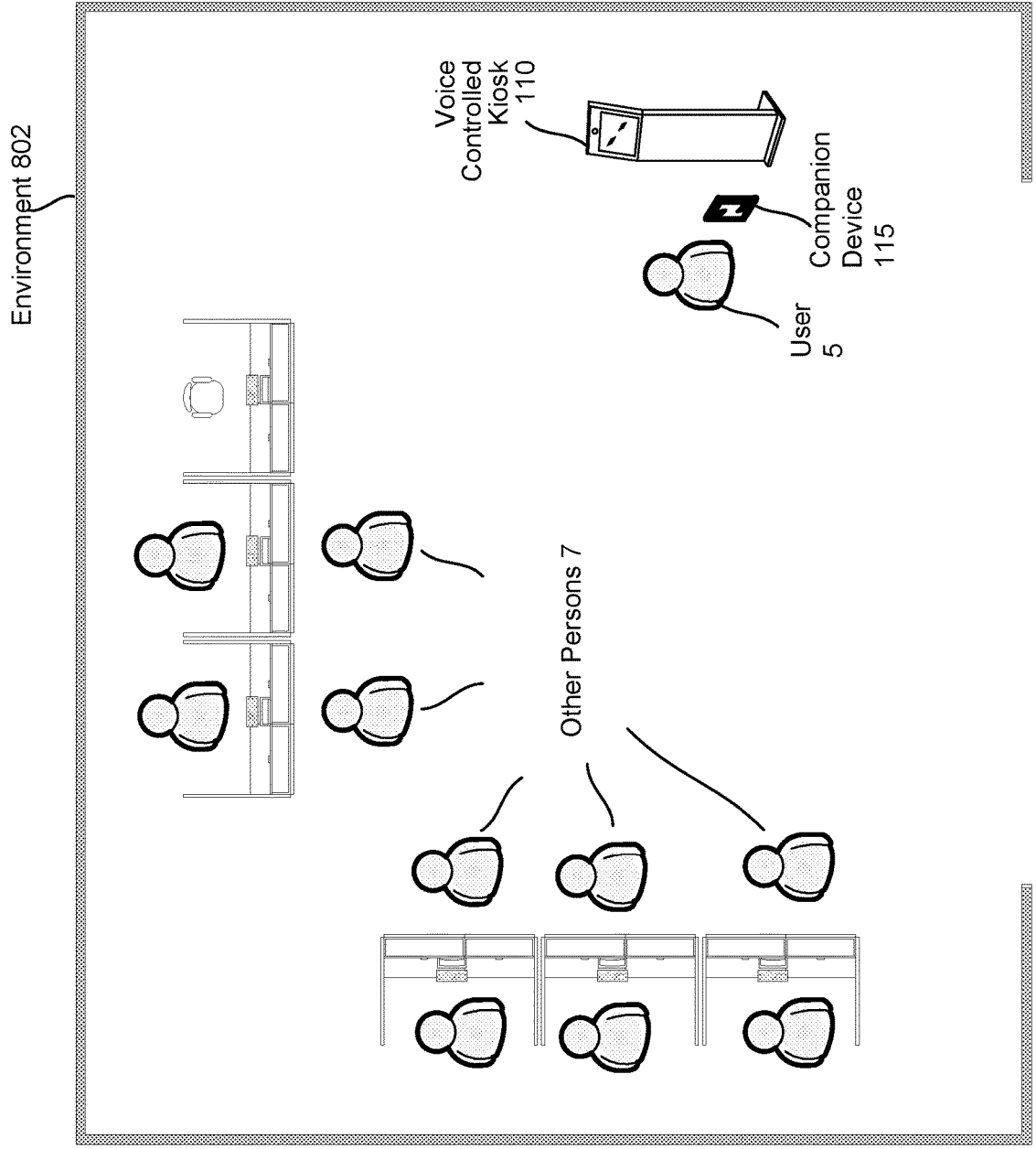
FIG. 8 is an illustration of an environment for operation of components of the system according to embodiments of the present disclosure.

FIG. 8 illustrates an example public environment 802 where a user 5 is interacting with a voice controlled kiosk 110. Also present in the environment 802 are other persons 7. The user 5 may also have a companion device 115. As an example, the user 5 may be speaking to the voice controlled kiosk 110 in the lobby of a hotel in order to obtain a room and room key code.

As explained above in reference to FIG. 3, the system may use various techniques to identify the user 5. In one example, the system may recognize what users are in the environment 802 through beaconing or other wireless matching techniques. For example, an application running on the companion device 115 may be capable of causing the companion device 115 to emit and/or respond to beacons (for example from voice controlled kiosk 110) or from another device associated with environment 802. The beacons can be received by a device and sent to the server(s) 120 with an indication of the sending local device. In this manner (and using other GPS or other information) the system can track what users are nearby what devices, such as what user mobile devices are near voice controlled kiosk 110. The system can detect a wireless signal within the environment 802, determine that the wireless signal is associated with a device identifier corresponding to companion device 115 and determine that the companion device 115 is associated with an identifier corresponding to the user 5. The system may determine that the output data with the sensitive information (e.g., the room number and room code) should be sent to the second device of the user. The system may cause the output data to be sent to the second device of the user (e.g., companion device 115) by routing the output data to the companion device 115 through a variety of means (e.g., direct message to the device 115, through an email to the user viewable on the companion device 115, through an application that may show messages to the user on the companion device 115, or the like).

In another example, a local device can detect wireless networks. For example, an application on companion device 115 may be configured to access a wireless signal detected by the companion device 115 (when the companion device 115 is in the environment 802) and push that information to the server(s) 120. The system can them compare those signatures to known signatures to figure out which users are nearby which public devices. For example, devices for other persons 7 may also recognize similar wireless signals, thus indicating that user 5 is in the same environment as other persons 7 and the voice controlled kiosk 7.

The user may also tap a private device (such as companion device 115, a wearable device, etc.) to a public device (kiosk 110, conference room device, or the like) to have system log the user's presence in the environment 802. Other user location techniques may also be used.

User location information may then be used to bias speaker identification processing by audio module 310 ID or other system personalization (for user preferences, anaphora resolution, or the like). For example, when the system attempts to identify a user who spoke an utterance using audio module 310, the system may only obtain reference data from user recognition data storage 410 corresponding to users the system knows are in the area of the device that captured the utterance (e.g., voice controlled kiosk 110). This may make audio-based user recognition significantly easier as data for only a certain number of users (e.g., user 5 and other persons 7 in environment 802) may be used to attempt to match to a voice of an utterance captured by voice controlled kiosk 110.

Once a user has been determined to be speaking to/in the environment of a voice controlled device 110, the system may associate the user identifier of the user with the device 110 for a certain time period. The time period may be based on the user identifier, the device 110, the environment, or other factors. For example, if the device 110 is located in a hotel room, and the system determines the user will be staying in the hotel room for four nights (for example using data available to the hotel, the user's calendar data, or the like), the system may determine to associate the user's identifier to the device 110 until checkout after the fourth night. Thus, when a further utterance is detected by the device 110, if the time period has not expired, the system may perform speech processing and command execution on an utterance using the user's identifier without necessarily going through other user recognition or other processes. In another example, if the user is in a conference room to attend a meeting that the system determines is scheduled for one hour, the system may associate the user's identifier with a device in the conference room for two hours (or some other time period). Various techniques for determining a length of association between a user and device are possible.

Using techniques described herein, the system may also allow different users to have different permissions associated with different devices. For example, a user checked into a hotel room may be given permission to control the room's lights, temperature, etc. through a device 110 in the hotel room. The system may recognize what lights are referred to in a command to a hotel room device 110 through a profile associated with the device and the lights. Such a profile may also indicate that a user associated with the hotel room device 110 (if temporarily) has permission to control that room's lights. Further, the system may recognize that the user can control aspects of the hotel room, even if not in the hotel room itself. For example, if the user speaks a command to "turn on the air conditioning in my room" to the voice controlled kiosk 110 in the hotel lobby, the system may recognize the user who spoke the command, associate that user with the appropriate room, and cause the air conditioning to be turned on in that room. After a certain time period, for example after checkout, the system may disassociate the user identifier from the corresponding device(s) and the user may no longer have permission to control items related to the hotel room. In another example, certain users may have certain permissions that differ from other users. For example, a hotel manager may have permission to speak an utterance to unlock any hotel room door whereas other users may only have permission to speak an utterance to unlock their own door. Such permission control may also apply to guests visiting a home that has a private device where the guest may have permission to turn on lights and play music, but may not have permission to pay bills, place product orders, or other prohibited activities.

As noted above, the system may also consider the public/ private state of the user and/or the original audio capture device 110 when determining how to send the user output data that may include public portions versus private portions. Public response data may be sent to a public device, but private response data may be sent to a private device (e.g., a user's cell phone). The routing may depend on the data itself (e.g., how sensitive the data is), the environment of the user (e.g., private data may still be sent for output to a public device if no other users are around or may be routed to a different device if other users are present) or other factors. For example, a request to a mall kiosk for "where is the nearest pizza place" may result in a spoken response from the kiosk, but a request to the same mall kiosk for "when is my next appointment" may result in the system pushing a response to the user's device to avoid nearby users overhearing the response. As another example, if a user asks a public kiosk "what's on my calendar" the system may cause certain non-sensitive information to be output through the kiosk (e.g., "you have an appointment to meet Jill at the food court in 15 minutes") while other information may be sent to the user's device (e.g., "you have an appointment to pick up the birthday present for your mom in 15 minutes"), particularly if the system detects that the user's mother is with the user when the question was asked.

This response selection resulting from a command at a public device may depend on user identification techniques. The response may also consider the user identifier in other ways for command execution such as user preferences (e.g., which pizza place to recommend to the user), other nearby users (e.g., also recommending a sandwich shop when you are with your child who doesn't like pizza), etc. Requests made to a public device may also require some form of dual authentication (pressing the "confirm" button on your app) to avoid commands being associated with you that were spoken by others. Response/further authentication may also depend on how many other users are near the device/privacy status of the user.

As another example, even if a device is in a public location, for purposes of delivering the requested output content, the environment of the device (for example relative to the requesting user) may be considered private. For example, if a user's is operating a peripheral device such as headphones (wired or wireless) that connect to the voice controlled device 110, and the output audio data may be configured in an audio form for delivery to the user, the device may be considered private relative to the user because the user is operating the headphones that connect to the voice controlled device 110. In this example, the system may deliver audio output data (which may include private information) to the public device 110, with instructions to deliver the output data to the user's headphones (rather than, for example, for output by a speaker of device 110 where such output may be heard by others). In this manner the user's headphones may function in a similar manner as companion device 115. Thus the system may cause deliver of output data including sensitive information by routing it through the public device 110 to the user's second device (e.g., the headphones). In a similar example, if the output data includes image or text data with sensitive information, the system may still send the output data for display on device 110 if the system determines that the data is unlikely to be viewed by individuals other than user 5 (for example, if the system determines that no other users are within a line of sight with a screen of the device 110). Many such examples are possible with different types of output data (e.g., text, audio, images, or the like).

The selection of a delivery mechanism for output data may depend on both the level of sensitivity of the output data and the level of publicness of the output mode of the device to which the data will be sent. Thus the system may score the output data based on a determined level of sensitivity. The score may correspond to the entire output data or the output data may be separated into portions, with each portion receiving its own respective sensitivity score. Further, the system may score potential delivery options (e.g., to a public device 110, companion device 115, other user device connectable to the public device 110, email or other communication account of a user, or the like) depending on the public/private state of the potential delivery option. The system may then select one or more delivery options for one or more portions of the output data based on the most desirable method for delivering the particular portion of output data. How sensitive the system considers certain information, as well as how private/public the system considers certain delivery options may depend on a variety of factors such as user preferences, group selections, geographic location (as information may be considered to have different levels of sensitivity in different cultures) and a wide variety of others. The system may use machine learning techniques to train one (or more) model(s) to determine a score for the privacy of the output data (or portion thereof). The system may also use machine learning techniques to train another (or more) model(s) to determine a score for the potential delivery option for the particular portion of output data.

Figure 9A:
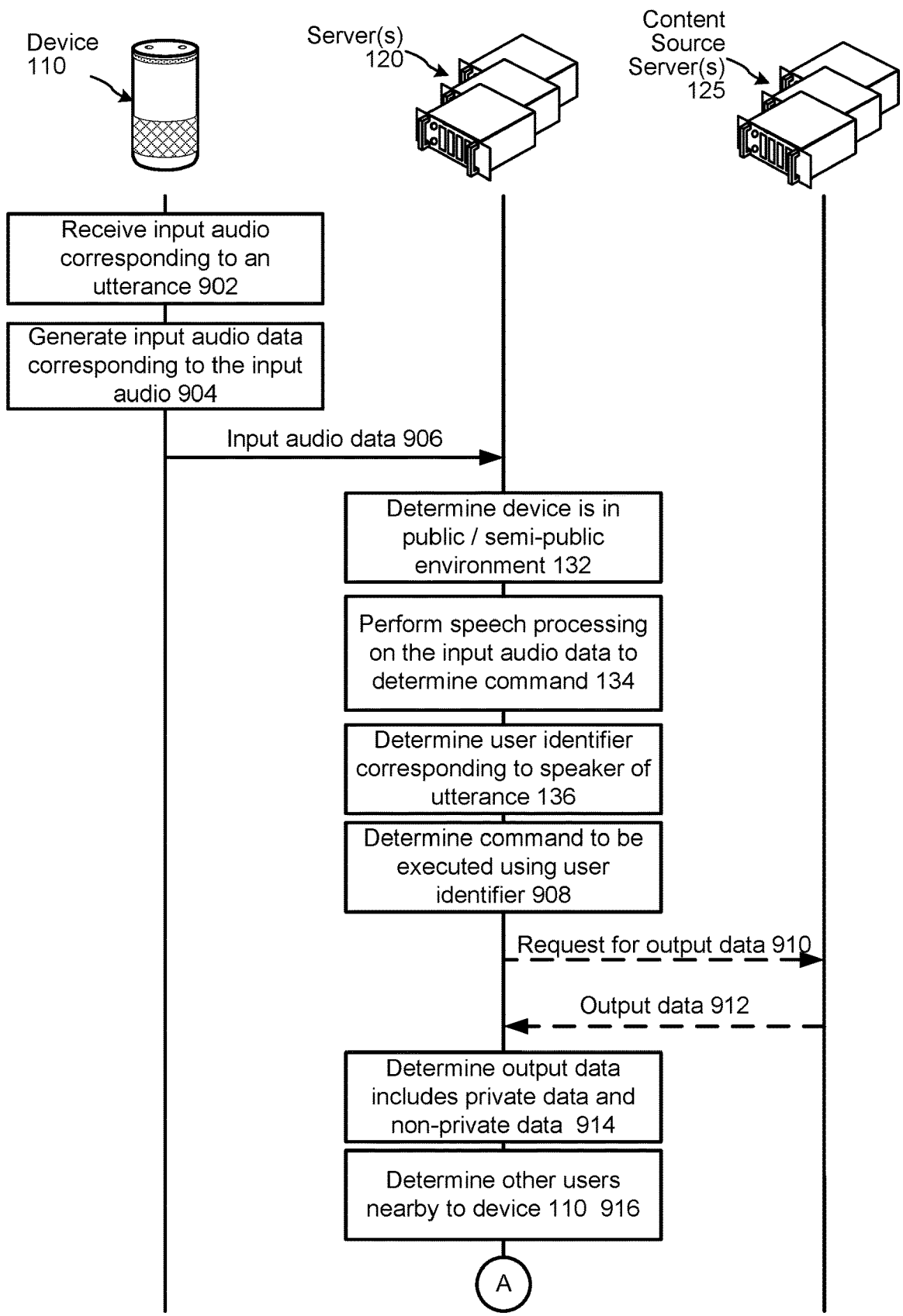

An example of interaction with a public device to deliver private data is illustrated in FIGS. 9A and 9B. As shown in FIG. 9A, a device 110 may receive (902) input audio corresponding to an utterance. The device 110 may then generate (904) input audio data corresponding to the input audio and send (906) the input audio data to the server(s) 120. The server(s) 120 may then receive (130) the input audio data and may determine (132) that the input audio data was sent by a device that is in a public/semi-public environment. To do so the system may access a profile associated with device 110 and determine that a public flag has been set with respect to the device 110. The server(s) 120 may perform (134) speech processing on the input audio data to determine a command. The server(s) 120 may determine (138) a user identifier corresponding to the utterance, for example using techniques described above in reference to FIGS. 3 and 4. The server(s) 120 may then determine (908) a command to be executed using the user identifier. The server(s) 120 can then identify a content source server 125 that can execute all or part of the command or otherwise obtain output data. The server(s) 120 may send (910) a request for output data to the content source server 125 and may receive (912) output data from the content source server. The server(s) 120 may then determine (916) that the output data includes private and non-private data. For example the server(s) 120 may determine that a first portion of the output data includes at least some private information but that a second portion of the output data does not include any private information. The server(s) 120 may then determine to send the private information separately from the non-private information, for example as a result of the system determining (916) that other users besides the user who spoke the utterance are nearby to the device 110.

Turning to FIG. 9B, the server(s) 120 may perform (140) TTS on text data corresponding to the second (non-private) portion of the output data to determine audio output data. The server(s) 120 may then send (142) the output audio data 142 to the device 110 along with an instruction for the device 110 to output audio corresponding to the output audio data. The device 110 may then output (918) audio corresponding to the output audio data. The server(s) 120 may identify (144) a second device associated with the user identifier, where the second device may be associated with a more private status than device 110, for example the second device being a personal mobile device such as companion device 115. The server(s) 120 may then determine (920) the private (e.g., first) portion of the output data may send (146) the private portion of the output data to the second device, e.g., companion device 115.

In certain configurations the server(s) 120 may operate to adjust the arrangement of the output data such that only non-private information is sent to the device 110. For example, if the output data from a content server 125 includes information such as "the ride you ordered to Main Street will arrive in 15 minutes," the server(s) 120 may create public output data such as "your request will be ready in 15 minutes" that may be sent to device 110 in order to publicly acknowledge the command without necessarily divulging any private information through device 110. The full private information may also be sent to the second device, such as companion device 115. Thus the server(s) 120 may remove/alter private information for purposes of output using a public device.

To determine that a device is in a public or semi-public environment the system may, as discussed, determine that a flag or other indicator associated with a device indicates that the device is in a public (e.g., mall, hotel lobby, etc.) or semi-public (e.g., conference room, etc.) location. Simply determining that the device is in the public or semi-public location may be sufficient for purposes of determining the type of environment of the device. In other situations, however, the system may attempt to make a more specific determination of the environment of the device (e.g., the device's physical surroundings) with regard to how output data might be output. Such determination may take into account a public/semi-public indicator but may also make use of other data such as what other users are present in the environment, whether the requesting user can interface with the device in a private way (e.g., using headphones, a screen which only the requesting user can see, other private input/output techniques, etc.). Further, the determination as to the type of the environment of the device (e.g., public, private, semi-public, static, in-flux, etc.) may be dynamic and may regularly be updated such that if the environment changes while the user is interacting with the system, the system may continually check the environment and route (or re-route) output data depending on conditions of the device's environment as they change. For example, the system may process information location of the device 110 to determine that the device is in a high-person traffic area (e.g., a hotel lobby, supermarket, or the like) and thus may more frequently update that device's environment information than the system might with a device in a lower-person traffic area (e.g., a conference room).

In considering the type of the environment of the device, the system may also consider the identity of the individuals in the environment of the device, and in particular the relationship of the individuals to each other. For example, if a group of individuals are al standing together around hotel kiosk 110 of FIG. 8 while one of the users is checking into a hotel, the system may determine that individuals are all part of a family group and may decide that the output data for the utterance (e.g., room check-in information) is appropriate to display to the entire group and may thus route the data to the kiosk 110 to all the group members as if the kiosk 110 was private. Thus, for the information to be output in that example, the kiosk 110 may be considered to be in a private environment, even though multiple individuals are in the location of the kiosk 110. Thus the system may consider the number of individuals around a device 110, the identities of those users, the relationship of those users to each other, the information to be output, and/or other factors in determining whether the device 110 is in a public/private environment (particularly with regard to the data to be output), and how the output data should be routed.

The relationship of the individuals near a device 110 may impact a public/private determination differently depending on the relationship and the information to be output. For example, a family group may be considered a private group for purposes of hotel check-in information, but not necessarily for medical information (or other information) about one of the family members. Further, a group of friends who participate in a fantasy sports league may be considered a private group for purposes of information about the fantasy sports league, but not for other information.

Previous interactions between the users may be used to determine what users are permitted access to what data. For example, if a voice of a first user is detected in a private environment at the same time as a voice of a second user, the system may indicate that interaction in the profiles of the first and second user (or in some other manner). Thus the system may track when the users are in the same place at the same time, and in what context (e.g., at one of the user's homes, while watching as sporting event, or the like). The users may be located using their individual devices, their voices, their images, or other data.

Various user settings, machine learned behaviors, social media information, user profile information and other information may be used to determine a relationship between pairs of users or among groups of users as well as what information should be considered public or private. Further, as with any of the examples herein, the system may prompt a requesting user as to whether output data should be sent to a voice controlled device 110 that captured an utterance or to another device (such as companion device 115) of the user.

Figure 10:
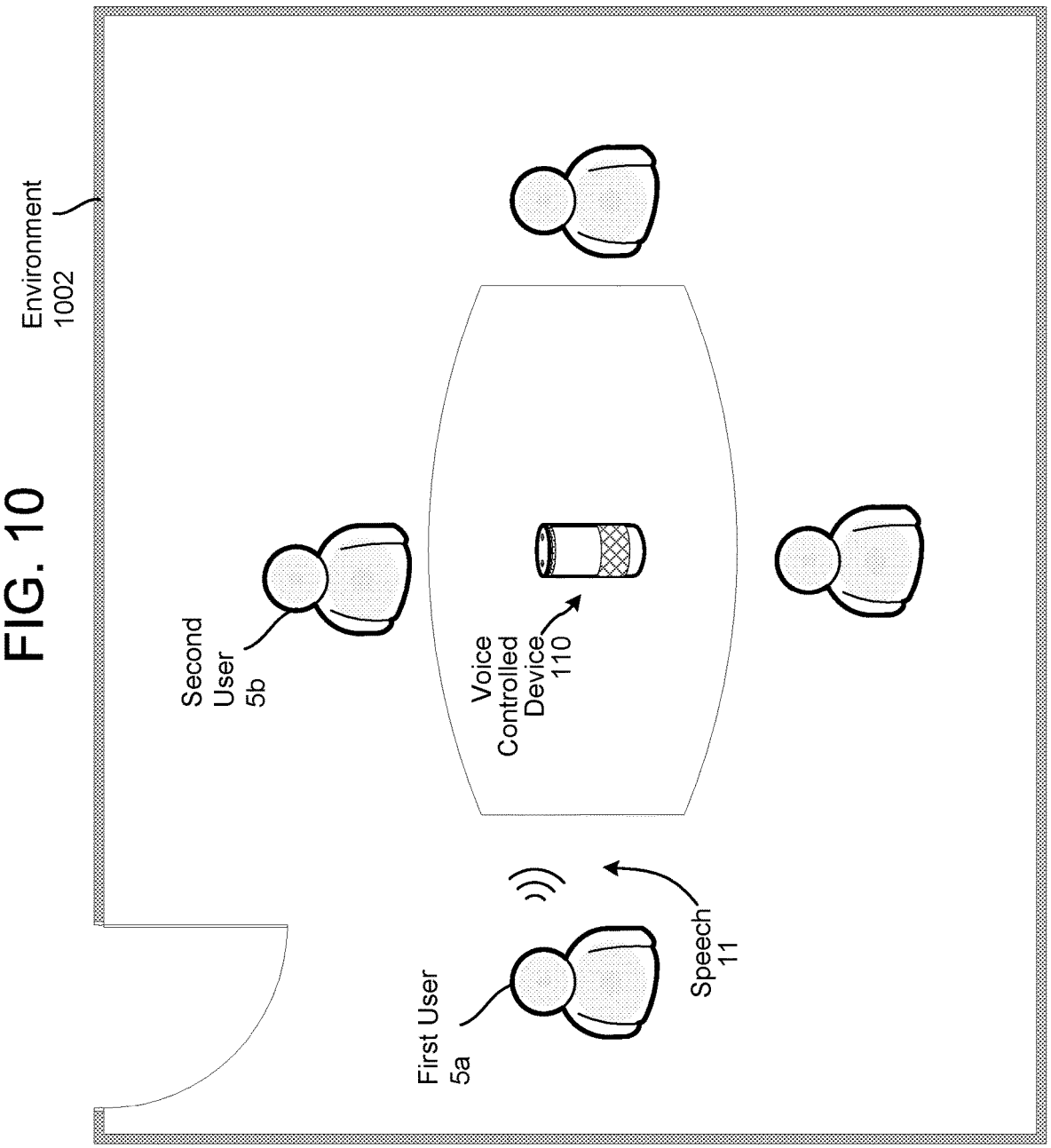
FIG. 10 is an illustration of an environment for operation of components of the system according to embodiments of the present disclosure.

The system may also be configured to allow users that are present in an environment to access information related to a particular utterance, such as one that takes place as part of a meeting, transaction, etc. For example, as illustrated in FIG. 10, a number of users may be present in an environment 1002. The users may be present for a meeting, conversation, or other event. The system may (using techniques described herein) determine what users are present. A first user 5*a* may speak an utterance to the voice controlled device 110 related to some aspect of the meeting. For example, the first user 5*a* may say "schedule another meeting for this group for next week" and the system may be able to identify the attendees in the environment 1002, check their calendars, check available rooms, and book a further meeting. The system may then give access to the meeting and related materials to the users in the room, including second user 5*b*. In another example, first user 5*a* may speak a command to the device 110 such as "record this meeting and send it to everyone here." The system may commence recording of the meeting and give access to the recording to the users in the environment 1002. Thus the system may determine a second (or third, fourth, etc.) user in the environment when the utterance was spoken, determine a second user identifier associated with the second user, determine further data corresponding to the utterance and associate the second user identifier (and the first user identifier for the first user 5*a* who spoke the utterance) with access to the further data. The further data may take many forms including calendar data, image data, audio data, permission data to other data related to the meeting and/or utterance, or the like. The system may also determine if a user is present in the room who was not necessarily on an initial meeting appointment (for example, the system detects a voice that does not match the known voice profiles of the individuals listed on a meeting calendar appointment) and thus may output a prompt as to whether the new user should be authorized to access the utterance and/or post-utterance data related to the meeting.

As another example, if a family of users was standing near kiosk 110 in FIG. 8 when user 5 is checking into the hotel, the user 5 may say "give my family here access to the room" and the system may determine who is nearby to user 5, and send each of their respective personal devices the information needed to access the room. To identify the other users in the environment to be given access to the further data a voice sample of each user may be given to the system (for example, each person says their name or the like) or other techniques such as those described herein may be used.

Various machine learning techniques may be used to train and operate models to operate various components and perform various steps described above, such as voice activity detection, user location detection, permission allocation, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks (such as deep neural networks (DNNs)), decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
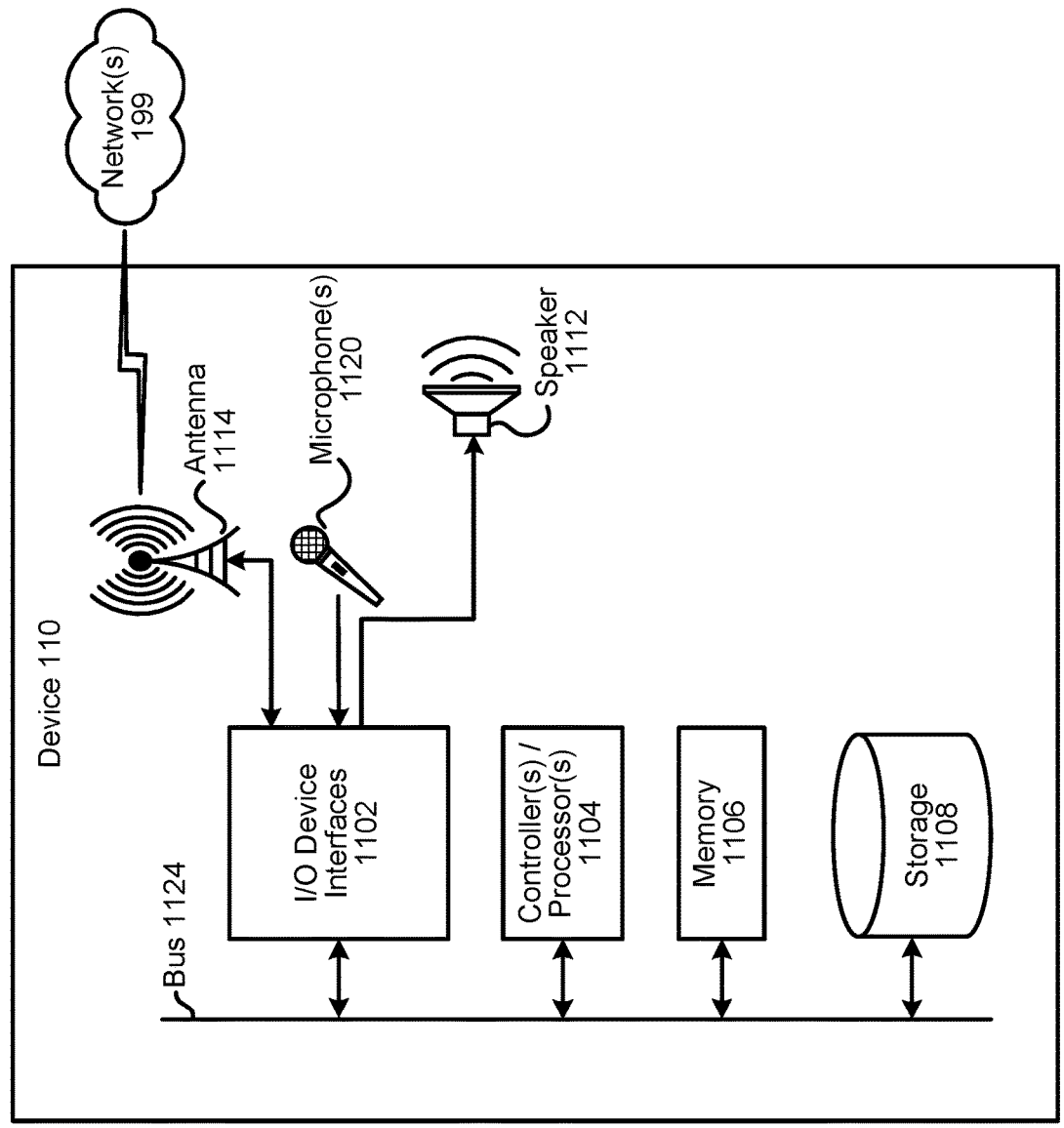
FIG. 11 is a block diagram conceptually illustrating example components of a device according to embodiments of the present disclosure.
Figure 12:
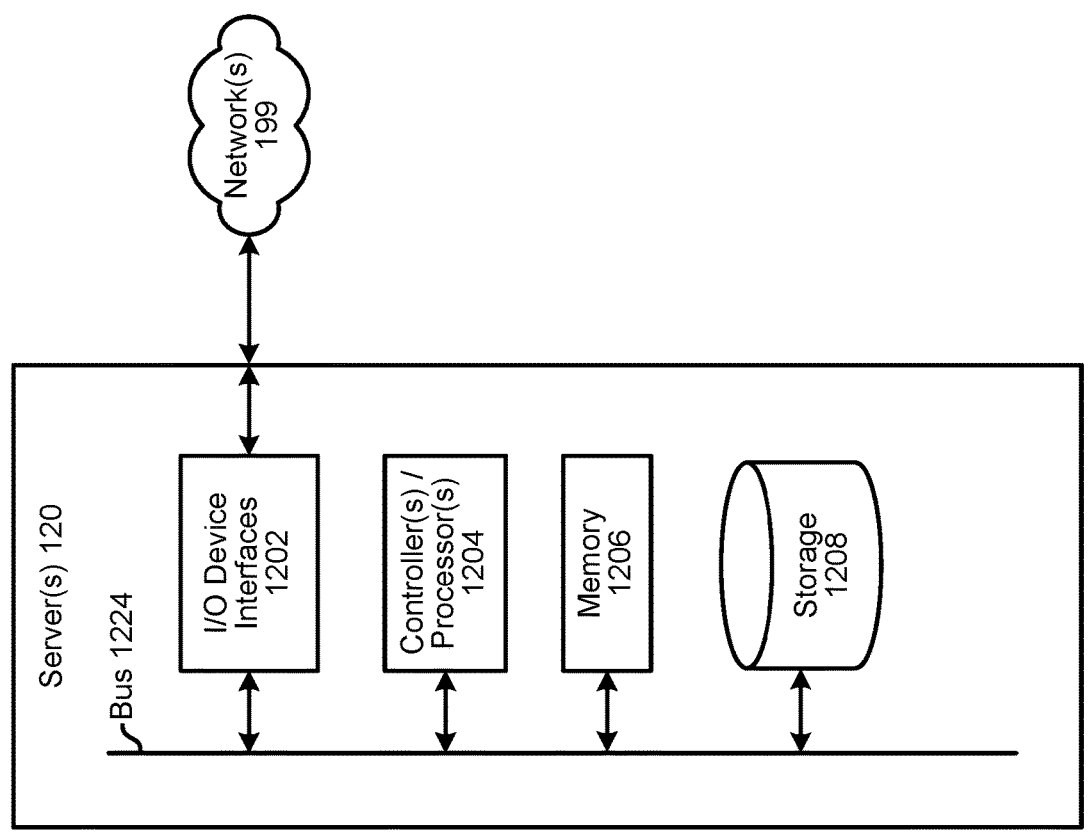
FIG. 12 is a block diagram conceptually illustrating example components of a server according to embodiments of the present disclosure.

FIG. 11 is a block diagram conceptually illustrating a user device 110 that may be used with the system. FIG. 12 is a block diagram conceptually illustrating example components of a remote device, such as the server(s) 120, which may assist with speech recognition processing, natural language processing, or command processing. Multiple servers 120 may be included in the system, such as one server 120 for performing speech recognition processing, one server 120 for performing natural language processing, etc. In operation, each of these devices (or groups of devices) may include computer-readable and computer-executable instructions that reside on the respective device (110/120), as will be discussed further below.

Each of these devices (110/120) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may also include a camera, display, touchscreen, buttons, and/or other not-illustrated input device.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1102/1202) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1102/1202), processor(s) (1104/1204), memory (1106/1206), and/or storage (1108/1208) of the device(s) 110 and server(s) 120, respectively. Thus, the speech recognition component 250 may have its own I/O interface(s), processor(s), memory, and/or storage; the natural language component 260 may have its own I/O interface(s), processor(s), memory, and/or storage; and so forth for the various components discussed herein.

The computer-readable media/memory (1106/1206) can include non-transitory computer-readable storage media, which can include hard drives, floppy diskettes, optical discs, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

In some implementations, the processor(s) (1104/1204) may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) (1104/1204) may possess its own local memory, which also may store program modules, program data, and/or one or more operating systems.

The computer-readable media/memory (1106/1206) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media/memory (1106/1206) may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Several modules such as instruction, data stores, and so forth may be stored within the computer-readable media/memory (1106/1206) and configured to execute on the processor(s).

Accordingly, when implemented as a primarily-voice-operated device there may be no input devices, such as navigation buttons, keypads, joysticks, keyboards, touch screens, and the like other than the microphone(s) 1120. Further, there may be no output such as a display for text or graphical output. The speaker(s) 1112 may be the main output device. In one implementation, the voice-controlled device 110 may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 110 may be implemented as an aesthetically appealing device with smooth and rounded surfaces, with one or more apertures for passage of sound waves. The device 110 may merely have a power cord and optionally a wired interface (e.g., broadband, USB, etc.). As a result, the device 110 may be generally produced at a low cost. Once plugged in, the device may automatically self-configure, or with slight aid of the user, and be ready to use. In other implementations, other I/O components may be added to this basic model, such as specialty buttons, a keypad, display, and the like.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 13:
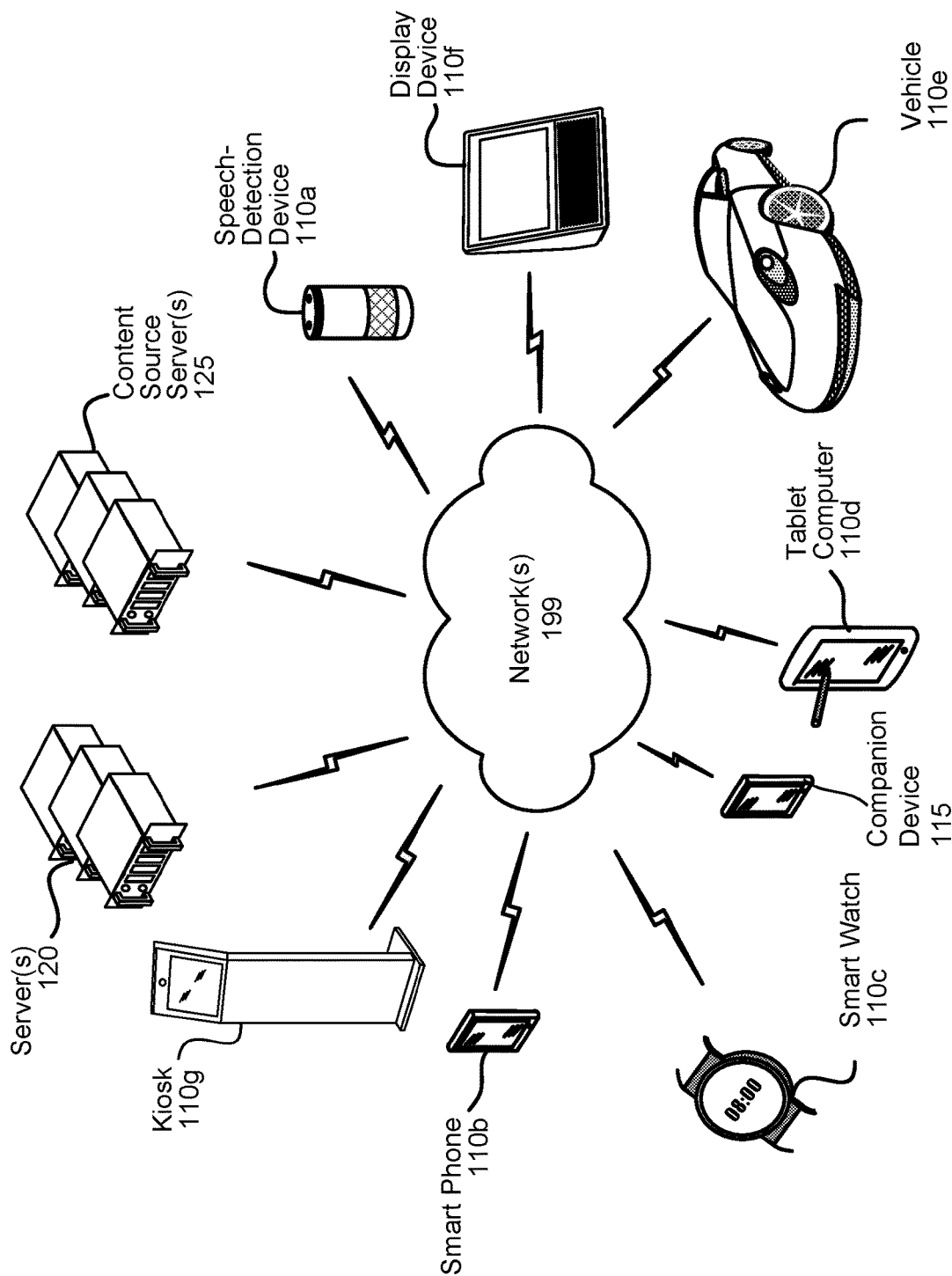
FIG. 13 illustrates an example of a computer network for use with the speech processing system.

As shown in FIG. 13, the voice-controlled device 110 may be implemented as a speech-detection device 110*a*, a smart phone 110*b*, a smart watch 110*c*, a tablet computer 110*d*, a vehicle 110*e*, a display device 110*f*, and/or a kiosk 110*g*. The mobile device 110*a* may include a touch-sensitive display screen and various buttons for providing input as well as additional functionality such as the ability to send and receive telephone calls. Alternative implementations of the voice controlled device 110 may also include configuration as a personal computer which may include a keyboard, a mouse, a display screen, and any other hardware or functionality that is typically found on a desktop, notebook, netbook, or other personal computing devices. The devices 110*a*-110*g* are merely examples and not intended to be limiting, as the techniques described in this disclosure may be used in essentially any device that has an ability to recognize speech input or other types of natural language input.

As illustrated in FIG. 13, multiple devices (110*a*-110*g*, 120, 125) may contain components of the system and the devices may be connected over a network(s) 199. The network(s) 199 may include a local or private network or may include a wide network such as the Internet. Devices may be connected to the network(s) 199 through either wired or wireless connections. The devices may be connected to the network(s) 199 through a wireless service provider, over a WiFi or cellular network connection, or the like. Other devices are included as network-connected support devices, such as the server(s) 120, the content source server(s) 125, or others. The support devices may connect to the network(s) 199 through a wired connection or wireless connection. Networked devices may capture audio using one-or-more built-in or connected microphones or other audio capture devices, with processing performed by speech recognition components, natural language components, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
receiving, from a voice controlled kiosk device, input audio data corresponding to an utterance;
performing speech processing on the input audio data to determine speech processing results;
determining that the voice controlled kiosk device is associated with a public device type;
determining that a first wireless signal was detected within an environment;
determining that the first wireless signal is associated with a first device identifier;
determining that the first device identifier is associated with a first user identifier;
selecting stored voice profile data associated with the first user identifier, the voice profile data including a biometric representation of a user's voice;
determining, using the voice profile data, the input audio data, and at least a portion of the speech processing results, that the utterance was spoken by the user;
causing a command corresponding to the speech processing results to be executed to determine first output data comprising a first portion and a second portion, wherein execution of the command is based at least in part on the first user identifier;
identifying that the first portion of the first output data includes only public information;
identifying that the second portion of the first output data includes only private information;
sending text data corresponding to the first portion to a speech component;
performing text-to-speech (TTS) processing on the text data to determine output audio data;
causing the output audio data to sent to the voice controlled kiosk device for playback as audio;
determining that a mobile device associated with the first user identifier is associated with a private device type, wherein the mobile device comprises a display component; and
causing the second portion to be sent to the mobile device for output using the display component.

2. The computer implemented method of claim 1, further comprising:
determining that a second wireless signal was detected within the environment;
determining the second wireless signal is associated with a second device identifier;
determining that the second device identifier is associated with a second user identifier associated with a second user;
determining the second user is within the environment;
determining that the second user identifier is associated with a second voice profile;
determining, using at least one profile that that second voice profile is not associated with the first user identifier, and
wherein causing the second portion of the first output data to be sent the mobile device is further based at least in part on the second user being within the environment.

3. The computer implemented method of claim 1, further comprising:
associating the first user identifier with the voice controlled kiosk device;
determining a time period based at least in part on the voice controlled kiosk device and the first user identifier;
receiving, from the voice controlled kiosk device, second input audio data corresponding to a second utterance;
performing speech processing on the second input audio data to determine second speech processing results;
determining that the time period has not expired; and
causing a second command corresponding to the second speech processing results to be executed, wherein execution of the second command is based at least in part on the first user identifier.

4. The computer implemented method of claim 1, further comprising:
determining, as a second data, further data corresponding to the command, the further data created as a result of the command;
determining a second user was within the environment when the utterance was spoken;
determining a second user identifier associated with the second user; and
associating the first user identifier and second user identifier with access to the further data.

5. A computer implemented method comprising:
receiving, from a first device, input audio data corresponding to an utterance;
determining the first device is associated with a public type of environment;
performing speech processing on the input audio data to determine a command;
determining a user identifier associated with the utterance;
causing the command to be executed to determine first output data, wherein execution of the command is based at least in part on the user identifier;
identifying a first portion of the first output data from the first output data, wherein the first portion consist of public information only;
identifying a second portion of the first output data form the first output data, wherein the second portion consists of private information only;
causing output audio data to be generated representing the first portion;
identifying based at least in part on the user identifier, a second device for receipt of private information, wherein the second device comprises a display component; and
based at least in part on the first device being associated with the public type of environment and the second device for receipt of the private information:
causing the output audio data to be sent to the first device for playback as audio, and
causing the second portion to be sent to the second device for output using the display component.

6. The computer implemented method of claim 5, further comprising:
processing the input audio data to determine that the utterance corresponds to a voice corresponding to the user identifier.

7. The computer implemented method of claim 6, further comprising, prior to determining the user identifier:
determining that a user is proximate to a location of the first device; and
selecting stored data corresponding to the voice,
wherein processing the input audio data to determine that the utterance corresponds to a voice of the user uses the stored data.

8. The computer implemented method of claim 7, wherein determining that the user proximate to the location of the first device comprises:
determining that a wireless signal was detected proximate to the location of the first device;
determining the wireless signal is associated with a device identifier;
determining that the device identifier is associated with the second device; and
determining that the second device is associated with the user identifier.

9. The computer implemented method of claim 5, further comprising, after determining the user identifier:
associating the user identifier with the first device;
determining a time period based at least in part on the first device and the user identifier; and
after the time period, disassociating the user identifier from the first device.

10. The computer implemented method of claim 5, further comprising:
determining a second user is proximate to a location of the first device, and
wherein causing the first output data to be sent the second device is further based at least in part on the second user being proximate to a location of the first device.

11. The computer implemented method of claim 5,
wherein causing the command to be executed further determines second output data comprising text data, and the method further comprises:
determining that the text data corresponds to second public information;
performing text-to-speech (TTS) processing on the text data to generate second output audio data; and
causing the second output audio data to be sent to the first device.

12. The computer implemented method of claim 5, further comprising:
determining a second user was proximate to a location of the first device when the utterance was spoken;
determining a second user identifier associated with the second user;
determining further data corresponding to the utterance; and
associating the user identifier and second user identifier with access to the further data.

13. The computer implemented method of claim 5, further comprising:
receiving, from the first device, second input audio data corresponding to a second utterance;
performing speech processing on the second input audio data to determine a second command;
determining, based at least in part on the second input audio data, the user identifier associated with the utterance; and
causing the second command to be executed to determine second output data, wherein execution of the second command is based at least in part on the user identifier.

14. The computer implemented method of claim 5, wherein a second type of environment associated with the second device is a private environment or semi-private environment.

15. A system comprising:
at least one processor; and
at least one memory including instructions operable to be executed by the at least one processor, to configure the system to:
receive, from a first device, input audio data corresponding to an utterance;
determine that the first device is associated with a public or semi-public environment;
perform speech processing on the input audio data to determine a command;
determine a user identifier associated with a user who spoke the utterance;
cause the command to be executed to determine first output data, wherein execution of the command is based at least in part on the user identifier;
determine that at least a portion of the first output data includes private information and at least another portion includes public or semi-public information;
identify a first portion of the first output data that includes only public or semi-public information from the first output data;
identify, based at least in part on the user identifier, a second device for receipt of the private information;
identify a second portion of the first output data that includes only private information from the first output data; and
based at least in part on the first device being associated with a public or semi-public environment and the second device for receipt of the private information:
cause the first portion of the first output data to be sent to the first device, and
cause the second portion of the first output data to be sent to the second device,
wherein the first portion of the first output data is output using a different type of output from the second portion of the first output data.

16. The system of claim 15, wherein the at least one memory further comprises instructions that, when executed by the at least one processor, further configure the system to, prior to determining the user identifier:
determine that the user is proximate to a location of the first device; and
select stored data corresponding to a voice of the user,
wherein processing the input audio data to determine that the utterance corresponds to a voice of the user uses the stored data.

17. The system of claim 16, wherein the instructions to determine that the user is proximate to the location of the first device comprise instructions to:
determine that a wireless signal was detected proximate to the location of the first device;
determine the wireless signal is associated with a device identifier;
determine that the device identifier is associated with the second device; and
determine that the second device is associated with the user.

18. The system of claim 15, wherein the at least one memory further comprises instructions that, when executed by the at least one processor, further configure the system to, after determining the user identifier:
- associate the user identifier with the first device;
- determine a time period based at least in part on the first device and the user identifier; and
- after the time period, disassociating the user identifier from the first device.

19. The system of claim 15, wherein the at least one memory further comprises instructions that, when executed by the at least one processor, further configure the system to:
- determine a second user is proximate to a location of the first device, and
- wherein causing the first output data to be sent the second device is further based at least in part on the second user being proximate to a location of the first device.

20. The computer implemented method of claim 5, further comprising:
- sending text data corresponding to the first portion to a text-to-speech component; and
- causing the text-to-speech component to process the text data to determine output audio data corresponding to the first portion of the first output data.

21. The system of claim 15, wherein the at least one memory further comprises instructions that, when executed by the at least one processor, further configure the system to:
- process the input audio data to determine that the utterance corresponds to a voice of the user.

22. The system of claim 15, wherein the at least one memory further comprises instructions that, when executed by the at least one processor, further configure the system to:
- determine text data that corresponds to the public or semi-public information;
- perform text-to-speech (TTS) processing on the text data to generate output audio data; and
- cause the output audio data to be sent to the first device.

* * * * *